US008980488B2

(12) United States Patent
Tatsui et al.

(10) Patent No.: US 8,980,488 B2
(45) Date of Patent: *Mar. 17, 2015

(54) FUEL CELL SYSTEM

(75) Inventors: Hiroshi Tatsui, Shiga (JP); Kiyoshi Taguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 822 days.

This patent is subject to a terminal disclaimer.

(21) Appl. No.: 13/057,663

(22) PCT Filed: May 7, 2010

(86) PCT No.: PCT/JP2010/003148
§ 371 (c)(1),
(2), (4) Date: Feb. 4, 2011

(87) PCT Pub. No.: WO2010/131447
PCT Pub. Date: Nov. 18, 2010

(65) Prior Publication Data
US 2011/0136025 A1    Jun. 9, 2011

(30) Foreign Application Priority Data

May 12, 2009  (JP) ................ P2009-115413

(51) Int. Cl.
*H01M 8/04* (2006.01)
*H01M 8/06* (2006.01)
(Continued)

(52) U.S. Cl.
CPC ............ *H01M 8/0612* (2013.01); *C01B 3/00* (2013.01); *C01B 3/384* (2013.01); *C01B 3/48* (2013.01); *H01M 8/04223* (2013.01); *H01M 8/04776* (2013.01); *C01B 2203/0233* (2013.01);
(Continued)

(58) Field of Classification Search
USPC ........................................................ 429/428
See application file for complete search history.

(56) References Cited

U.S. PATENT DOCUMENTS 8,507,136 B2 *  8/2013  Tatsui et al. ............... 429/408
2003/0068540 A1  4/2003  Ueda et al.
(Continued)

FOREIGN PATENT DOCUMENTS

CN          1409428 A        4/2003
DE  10 2005 030 909 A1     1/2007
(Continued)

OTHER PUBLICATIONS

International Search Report for International Application No. PCT/JP2010/003148, dated Jul. 6, 2010, 2 pages.
(Continued)

*Primary Examiner* — Ula C. Ruddock
*Assistant Examiner* — Jacob Marks
(74) *Attorney, Agent, or Firm* — McDermott Will & Emery LLP

(57) ABSTRACT

A fuel cell system includes a reforming unit, a carbon-monoxide decreasing unit, a fuel cell, a burner unit, and a raw gas supply device. At a start-up operation of the fuel cell system, an amount of raw gas supplied from the raw has supply device is adjusted according to an amount of a desorbed raw gas desorbed out of components of the raw gas adsorbed to at least one of the reforming catalyst and a carbon monoxide decreasing catalyst such that a ratio of an amount of the combustion air to an amount of the raw gas in the burner unit falls within a predetermined range.

11 Claims, 13 Drawing Sheets

(51) Int. Cl.
*C01B 3/00* (2006.01)
*C01B 3/38* (2006.01)
*C01B 3/48* (2006.01)

(52) U.S. Cl.
CPC ... *C01B2203/0283* (2013.01); *C01B 2203/044* (2013.01); *C01B 2203/047* (2013.01); *C01B 2203/066* (2013.01); *C01B 2203/0811* (2013.01); *C01B 2203/0822* (2013.01); *C01B 2203/0827* (2013.01); *C01B 2203/1235* (2013.01); *C01B 2203/1247* (2013.01); *C01B 2203/1264* (2013.01); *C01B 2203/1288* (2013.01); *C01B 2203/1604* (2013.01); *C01B 2203/169* (2013.01); *C01B 2203/1695* (2013.01); *Y02E 60/50* (2013.01)
USPC .......................................................... 429/428

(56) References Cited

U.S. PATENT DOCUMENTS

| | | |
|---|---|---|
| 2004/0253493 A1 | 12/2004 | Kamijo |
| 2005/0249992 A1* | 11/2005 | Bitoh ................................ 429/24 |
| 2006/0046114 A1* | 3/2006 | Kato et al. ........................ 429/22 |
| 2008/0057359 A1* | 3/2008 | Venkataraman et al. ........ 429/13 |
| 2009/0123797 A1* | 5/2009 | Kaye et al. ....................... 429/17 |
| 2010/0203403 A1 | 8/2010 | Kani et al. |

FOREIGN PATENT DOCUMENTS

| | | |
|---|---|---|
| JP | 2002-308602 A | 10/2002 |
| JP | 2004-284875 A | 10/2004 |
| JP | 2004-307236 A | 11/2004 |
| JP | 2005-050788 A | 2/2005 |
| JP | 2008-218355 A | 9/2008 |
| JP | 2008-288187 A | 11/2008 |
| WO | WO 2009/004803 A1 | 1/2009 |

OTHER PUBLICATIONS

Office Action from counterpart Chinese Application No. 201080002471.6, dated Jan. 30, 2013, 10 pages (with translation).
Supplementary European Search Report issued in corresponding EP Patent Application No. 10774706.5 on Oct. 29, 2014; 5 pages.

* cited by examiner

FUEL CELL SYSTEM

This application is a 371 application of PCT/JP2010/003148 having an international filing date of May 7, 2010, which claims priority to JP2009-115413 filed on May 12, 2009, the entire contents of which are incorporated herein by reference.

TECHNICAL FIELD

The present invention relates to a fuel cell configured to supply a reformed gas generated by reforming a hydrocarbon-based raw material to a fuel cell, thereby generating electric power.

BACKGROUND ART

A fuel cell supplies hydrogen or a hydrogen rich gas to one of electrodes between which an electrolyte is interposed, and also supplies an oxidant gas containing oxygen, such as air, to the other of the electrodes, thereby generating electric power through an electrochemical reaction. Recently, attention is focused on a cogeneration system that utilizes electric power generated by a fuel cell and also recovers heat generated when the fuel cell generates electric power, to thus utilize the recovered heat as heat energy.

In the fuel cell system, as one of methods for generating a hydrogen rich gas required for a fuel cell, a hydrocarbon based raw gas, such as a town gas or an LPG, is subjected to a steam reforming reaction along with steam in a reforming unit filled with a reforming catalyst at about 700° C., thereby generating a reformed gas containing hydrogen as a major component. During the steam reforming reaction, a carbon monoxide in an amount of about 10 to 15% contained in a reformed gas output from the reforming unit is generated at this time as a by-product. Carbon monoxide poisons an electrode catalyst of the fuel cell, thereby deteriorating power generation capacity. For this reason, it is necessary to eliminate carbon monoxide in the reformed gas up to a carbon monoxide content of 100 ppm or less and, more preferably, 10 ppm or less.

Generally, a shift unit and a selective oxidation unit are provided as a carbon monoxide decreasing unit at downstream of the reforming unit. The shift unit is filled with a shift catalyst that causes carbon monoxide in a reformed gas output from the reforming unit to react with steam, thereby performing the water gas shift reaction to form hydrogen and carbon dioxide. The selective oxidation unit is filled with a selective oxidation catalyst and is supplied air and the reformed gas of which carbon monoxide concentration is decreased by the shift unit, thereby subjecting carbon monoxide and oxygen in the air to a selective oxidation reaction such that concentration of carbon monoxide in the reformed gas is decreased to 10 ppm or less. At this time, the shift unit performs the water gas shift reaction at a temperature of about 200° C. or more, and the selective oxidation unit performs the selective oxidation reaction at a temperature of about 100° C.

The reforming unit further includes a heating burner unit. During power generation of the fuel cell system, the burner unit burns hydrogen in a reformed gas that has not been used in power generation of in the fuel cell (hereinafter described as an "off-gas"), using the air supplied to the burner unit, thereby maintaining at about 700° C. the temperature of the reforming catalyst for a reforming reaction which is an endothermic reaction. Moreover, during a start-up operation of the fuel cell system, the burner unit burns a raw gas not yet used for generating hydrogen and a mixed gas containing the raw gas and hydrogen, thereby increasing the temperature of the reforming catalyst.

Hereinafter, a hydrogen production device including a reforming unit equipped with a burner unit, the shift unit, and the selective oxidation unit are connected is described as a fuel processor, when necessary.

At the start-up operation of the fuel cell system, it is necessary to heat the catalysts in the fuel processor to predetermined temperatures for generating a reformed gas from a raw gas. There is disclosed a method which includes: supplying a raw gas to a fuel processor; returning the raw gas output from the fuel processor to the burner unit through a channel bypassing the fuel cell, thereby burning the returned raw gas; and heating the catalysts of the fuel processor by combustion heat (see, for example, Patent Document 1).

When power generation of the fuel cell system is halted, supply of the raw gas and steam to the reforming unit is suspended. At this time, an interior of the fuel processor is depressurized by volume shrinkage due to a temperature fall of the reformed gas remaining in the fuel processor or condensation of steam in the reformed gas due to the temperature fall. In order to avoid such depressurization, when stopping operation, supply of the raw gas and the steam is first suspended, and after the temperature of the fuel processor has decreased to a predetermined temperature, the reformed gas in the fuel processor is purged by the raw gas. When the internal pressure of the fuel processor has decreased to the predetermined pressure level or less, the raw gas is supplied to the fuel processor, thereby maintaining positive pressure (see, for example, Patent Document 2).

Related Art Document

Patent Document

Patent Document 1: JP-A-2008-218355
Patent Document 2: JP-B-4130603

SUMMARY OF THE INVENTION

Problem to be Solved by the Invention

However, the related art fuel cell systems have the following problems.

When stopping power generation, the related art fuel cell system supplies a raw gas, such as a town gas or an LPG, to the fuel processor in order to purge the reformed gas containing steam in the fuel processor and keep the interior pressure of the fuel processor at positive pressure. At this time, in association with the temperature fall of the catalysts during stoppage of the fuel cell system, the raw gas or a portion of a component of the raw gas are absorbed to the catalysts.

Meanwhile, in order to increase the temperatures of the respective catalysts to predetermined temperatures at the start-up operation of the fuel cell system, the raw gas is supplied to the burner unit through the fuel processor, and is burnt with air, thereby increasing the temperatures of the catalysts. With the temperature rise of the catalysts, the components of the raw gas absorbed to the catalysts are desorbed and then supplied to the burner unit along with the raw gas supplied to the fuel processor. Therefore, an amount of raw gas actually supplied to the burner unit is larger than the amount of raw gas supplied to the fuel processor by an amount corresponding to the desorbed components of the raw gas. A ratio of the raw gas to air deviates, whereby incomplete combustion occurs in the burner unit. Moreover, carbon monoxide caused by incomplete combustion is emitted to the outside of the fuel cell system. In some cases, a flame vanish occurs in the burner unit. As a result, there arises a problem that the temperatures of the catalysts in the fuel processor are not increased, which impedes the start-up operation of the fuel cell system.

An aspect of the present invention solves the problems of the related art, and an object thereof is to provide a fuel cell system capable of performing a stable start-up operation with stable combustion in a burner unit.

Means for Solving the Problem

An aspect of the present invention provides a fuel cell system including: a reforming unit configured to subject a mixed gas containing a raw gas and steam to a reforming reaction by a reforming catalyst, thereby generating a reformed gas containing hydrogen; a carbon monoxide decreasing unit configured to allow the reformed gas generated by the reforming unit to contact a carbon monoxide decreasing catalyst, thereby decreasing carbon monoxide contained in the reformed gas; a fuel cell configured to generate electric power by hydrogen contained in the reformed gas passed through the carbon monoxide decreasing unit; a burner unit configured to burn at least one of an off-gas containing hydrogen not consumed in the fuel cell, the raw gas and the reformed gas using combustion air supplied by an air blower; and a raw gas supply device configured to supply the raw gas to the reforming unit and the burner unit directly or through the reforming unit, wherein at a start-up operation of the fuel cell system, an amount of raw gas supplied from the raw gas supply device is adjusted according to an amount of a desorbed raw gas desorbed out of components of the raw gas adsorbed to at least one of the reforming catalyst and the carbon monoxide decreasing catalyst.

Accordingly, stable combustion of the burner unit can continually be performed at the start-up operation of the fuel cell system.

Advantages of the Invention

The fuel cell system of an aspect of the present invention performs combustion in a burner unit such that a ratio of combustion air to the raw gas falls within a predetermined range, whereby stable combustion can be performed. It is possible to implement a fuel cell system capable of performing a stable start-up operation by increasing temperatures of catalysts in a fuel processor to predetermined temperatures.

MODE FOR CARRYING OUT THE INVENTION

Figure 1:
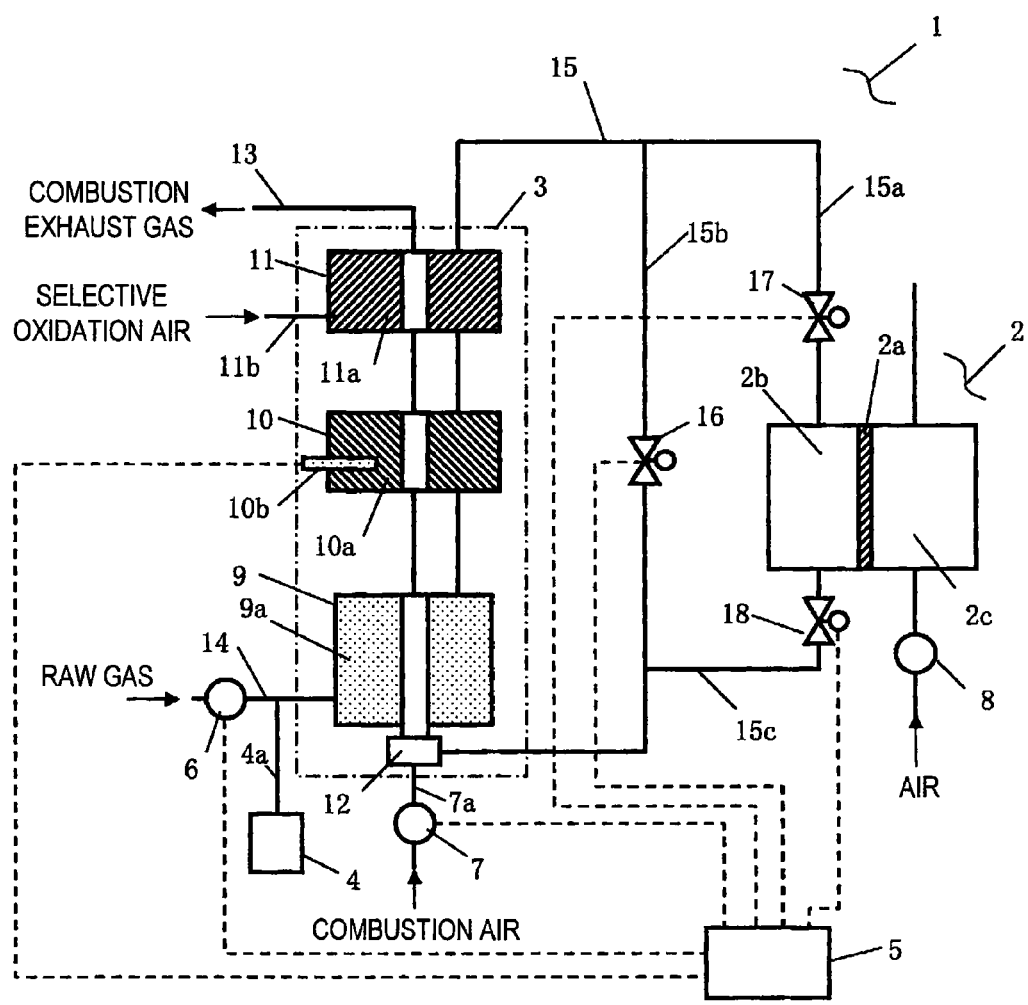
FIG. 1 is a schematic diagram showing a configuration of a fuel cell system of a first embodiment of the present invention.

An aspect of the present invention provides a fuel cell system comprising: a reforming unit configured to subject a mixed gas containing a raw gas and steam to a reforming reaction by a reforming catalyst, thereby generating a reformed gas containing hydrogen; a carbon monoxide decreasing unit configured to allow the reformed gas generated by the reforming unit to contact a carbon monoxide decreasing catalyst, thereby decreasing carbon monoxide contained in the reformed gas; a fuel cell configured to generate electric power by hydrogen contained in the reformed gas passed through the carbon monoxide decreasing unit; a burner unit configured to burn at least one of an off-gas containing hydrogen not consumed in the fuel cell, the raw gas and the reformed gas using combustion air supplied by an air blower; and a raw gas supply device configured to supply the raw gas to the reforming unit and the burner unit directly or through the reforming unit, wherein at a start-up operation of the fuel cell system, an amount of raw gas supplied from the raw gas supply device is adjusted according to an amount of a desorbed raw gas desorbed out of components of the raw gas adsorbed to at least one of the reforming catalyst and the carbon monoxide decreasing catalyst.

With this configuration, it is possible to perform stable combustion by adjusting a ratio of the amount of combustion air supplied to the burner unit to a total of the amount of raw gas supplied from the raw gas supply device and the amount of the desorbed raw gas supplied through the desorption so as to fall within a predetermined ratio. As a result, it is possible to provide a fuel cell system capable of performing the stable start-up operation by increasing the temperature of catalysts in the fuel processor to a predetermined temperature.

The fuel cell system may include heating means for performing a heating operation for at least one of the reforming catalyst and the carbon monoxide decreasing catalyst, wherein the heating means may heat at least one of the reforming catalyst and the carbon monoxide catalyst. With this configuration, the raw gas adsorbed to the catalysts can be effectively desorbed.

The fuel cell system may include measurement means for measuring at least a flow amount of the desorbed raw gas out of the raw gas by the raw gas supply device and the desorbed raw gas supplied to the burner unit, at the start-up operation of the fuel cell system. Even when the raw gas adsorbed to at least one of the reforming catalyst and the carbon monoxide decreasing catalyst is desorbed and supplied to the burner unit, it is possible to adjust the amount of combustion air according to the flow amount of raw gas supplied to the burner unit, whereby stable combustion can be performed in the burner unit.

In the fuel cell system, the measurement means may include a flow meter configured to measure at least the flow amount of the desorbed raw gas. With this configuration, the flow amount of the raw gas supplied to the burner unit can be accurately measured in a relatively easy manner. Consequently, the flow amount of combustion air supplied to the burner unit can be adjusted according to the flow amount of raw gas supplied to the burner unit, whereby stable combustion can be performed in the burner unit.

In the fuel cell system, the measurement means may include a pressure gauge configured to detect at least pressure of the desorbed raw gas. With this configuration, the flow amount of the raw gas can be measured from the pressure of the raw gas supplied to the burner unit by a relatively simple configuration. Consequently, the flow amount of combustion air supplied to the burner unit can be adjusted according to the flow amount of raw gas supplied to the burner unit, whereby stable combustion can be performed in the burner unit.

The fuel cell system may include exhaust gas analysis means for detecting a concentration of at least one component out of combustion exhaust gas components generated after combustion in the burner unit, wherein the amount of the raw gas supplied from the raw gas supply device may be adjusted according to the concentration detected by the exhaust gas analysis means. With this configuration, it is possible to determine that the state of combustion of the burner unit begins to be deteriorated due to the desorbed gas, and then adjust the flow amount of raw gas supplied from the raw gas supply device. Consequently, the burner unit can perform stable combustion.

The fuel cell system may include one or more temperature sensors configured to detect at least one of a temperature of the reforming catalyst and a temperature of the carbon monoxide decreasing catalyst, wherein the amount of the desorbed raw gas, which is desorbed out of the components of the raw gas adsorbed to at least one of the reforming catalyst and the carbon monoxide decreasing catalyst and which is to be burnt in the burner unit, may be estimated at the start-up operation of the fuel cell system based on at least one of the temperature of the reforming catalyst and the temperature of the carbon monoxide catalyst detected by the temperature sensor. With this configuration, it is possible to perform stable combustion in the burner unit by estimating the amount of desorbed raw gas with relatively superior accuracy and by a simple configuration.

The fuel cell system may include timer means for measuring a time elapsed since the heating means starts the heating operation, wherein the amount of the desorbed raw gas, which is desorbed out of the components of the raw gas adsorbed to at least one of the reforming catalyst and the carbon monoxide decreasing catalyst and which is to be burnt in the burner unit, may be estimated based on the time measured by the timer means. With this configuration the amount of the desorbed raw gas can be detected by a simple configuration.

In the fuel cell system, the heating means may start the heating operation for at least one of the reforming catalyst and the carbon monoxide decreasing catalyst at the start-up operation of the fuel cell system, and the raw gas supply device may be activated after elapse of a predetermined time since the heating means starts the heating operation.

With this configuration, during a time period until the raw gas supply device starts to operate, the raw gas components desorbed by heat-up of catalysts can be burnt before the raw gas supplied from the raw gas supply device is burnt.

The fuel cell system may include one or more temperature sensors configured to detect at least one of a temperature of the reforming catalyst and a temperature of the carbon monoxide decreasing catalyst, wherein the heating means may start the heating operation for at least one of the reforming catalyst and the carbon monoxide decreasing catalyst at the start-up operation of the fuel cell system, and wherein the raw gas supply device may be activated after the temperature detected by the temperature sensor becomes a predetermined temperature or more.

With this configuration, it is possible to gently decrease a rate of temperature rise in the catalysts with combustion of a small amount of raw gas without decreasing the amount of the raw gas supplied by the raw gas supply device. Further, even when the amount of the raw gas adsorbed to the catalysts at the start-up operation of the fuel cell system is smaller than the estimated amount and even when a flame vanish occurs because the amount of the desorbed raw gas is smaller than the estimated amount in an estimated time period in which the burner unit burns only the desorbed raw gas, the flame vanish can be detected by the rate of temperature rise in the catalysts detected by the temperature sensor.

In the fuel cell system the raw gas supply device and the heating means may be activated at the start-up operation of the fuel cell system, after the raw gas supply device supplies the raw gas for a predetermined time period, the raw gas supply device may be deactivated, and after elapse of a predetermined time period since the raw gas supply device is deactivated, the raw gas supply device may be activated.

With this configuration, a predetermined amount of the raw gas can be supplied to the burner unit from the raw gas supply device regardless of the amount of the desorbed raw gas desorbed from the catalysts. Consequently, the burner unit can perform stable ignition.

The fuel cell system may include one or more temperature sensors configured to detect at least one of a temperature of the reforming catalyst and a temperature of the carbon monoxide catalyst, wherein at the start-up operation of the fuel cell system, the raw gas supply device and the heating means may be activated, wherein after elapse of a predetermined time period since the raw gas supply device starts to supply the raw gas or after the temperature sensor detects a first predetermined temperature or more, the raw gas supply device may be deactivated, and wherein after the temperature sensor detects a second predetermined temperature or more, the raw gas supply device may be activated.

With this configuration, even when the amount of the desorbed raw gas desorbed from the catalysts is very little because of insufficient heating of the catalysts, a predetermined amount of raw gas can be supplied to the burner unit by the raw gas supply device. Consequently, the burner unit can perform stable ignition.

In The fuel cell system, the heating means may include an electric heater. With this configuration, it is possible to relatively easily control start and end of the heating operation for the catalysts. Since the electric heater can easily control a heating rate thereof by on/off control and input voltage control, it is possible to easily control the rate of temperature rise of the catalysts. As a result, by decreasing the rate of temperature rise, it is possible to prevent deterioration of the catalysts caused by sudden temperature changes. Conversely, by increasing the rate of temperature rise, it is possible to shorten the start-up time and adjust the amount of the desorbed raw gas desorbed from the catalysts.

In the fuel cell system, the heating means may include a heating burner unit, and at least one of the reforming unit and the carbon monoxide decreasing unit may be heated by a combustion exhaust gas of the heating burner unit. It is thereby possible to effectively utilize heat resultant of combustion in the heating burner unit for heating the catalysts. With this configuration, it is possible to implement a fuel cell system having a start-up characteristic with superior energy efficiency.

In the fuel cell system, the burner unit may be used as the heating burner unit. With this configuration, it is possible to reduce the number of the burner unit to one. Further, pipes used for supplying a raw gas and combustion air to the burner unit can also be simplified. As a result, the burner unit serving as heating means can be realized with a simple configuration. Hence, it is possible to prevent an increase in size and complexity of the fuel cell system.

Embodiments of the present invention are now described by reference to the drawings. Elements similar to those in the above-described embodiment are assigned the same reference characters, and the detailed description thereof is omitted. The present invention shall not be confined to the embodiments.

(First Embodiment)

FIG. 1 is a schematic diagram showing a configuration of a fuel cell system of a first embodiment of the present invention.

As shown in FIG. 1, a fuel cell system 1 of the present embodiment includes at least a fuel cell 2, a fuel processor 3, a steam generator 4, a control unit 5, a raw gas supply device 6, a combustion air fan 7, and a cathode air blower 8. The combustion air fan 7 serves as an air blower configured to supply combustion air to a burner unit 12 described later. An LPG is utilized at this time as a raw gas to be supplied to the fuel cell system 1, and an LPG cylinder (not shown) is connected to the raw gas supply device 6 outside the fuel cell system 1. Another hydrocarbon-based material, such as a town gas, can also be used as a raw gas. A sulfur compound added to a hydrocarbon-based material as an odorant is eliminated when the raw gas passes through a desulfurizing unit (not shown) placed at an upstream of the raw gas supply device 6 or between the raw gas supply device 6 and the fuel processor 3.

The fuel cell 2 has a structure in which a solid polyelectrolyte membrane 2a is sandwiched between an anode electrode 2b and a cathode electrode 2c. The anode electrode 2b is supplied with a reformed gas including a large amount of hydrogen generated by the fuel processor 3, and the cathode electrode 2c is supplied with air by means of the cathode air blower 8, whereby electric power is generated.

The fuel processor 3 has a configuration in which a reforming unit 9, a shift unit 10, and a selective oxidation unit 11 both of which make up a carbon monoxide decreasing unit are connected in sequence. The reforming unit 9 is filled with a reforming catalyst 9a; the shift unit 10 is filled with a shift catalyst 10a; and the selective oxidation unit 11 filled with a selective oxidation catalyst 11a.

The reforming unit 9 is provided with the burner unit 12. Hydrogen in the raw gas and hydrogen in an off-gas including hydrogen which was not used for power generation by the fuel cell 2 are burnt along with the air blown to the burner unit 12 by the combustion air fan 7 by way of a combustion air channel 7a. A resultant gas is emitted as a combustion exhaust gas to the outside of the fuel cell system 1 by way of a combustion exhaust gas channel 13. The combustion exhaust gas channel 13 is laid so as to assume a configuration in which the channel runs from the burner unit 12 through an interior space of the reforming unit 9, an interior space of the shift unit 10, and an interior space of the selective oxidation unit 11 that are partitioned so as not to directly contact the reforming catalyst 9a, the shift catalyst 10a, and the selective oxidation catalyst 11a.

The raw gas supplied by the raw gas supply device 6, by way of a raw gas supply channel 14, into the space filled with the reforming catalyst 9a of the reforming unit 9 first passes through a layer filled with the reforming catalyst 9a. Next, the raw gas exits from the reforming unit 9 and is supplied to a space filled with the shift catalyst 10a of the shift unit 10, thereupon passing through a layer filled with the shift catalyst 10a. The raw gas exits from the shift unit 10 and is supplied to the space filled with the selective oxidation catalyst 11a of the selective oxidation unit 11, thereupon passing through a layer filled with the selective oxidation catalyst 11a. Subsequently, the raw gas is circulated so as to exit from the selective oxidation unit 11 to a raw gas channel 15 by way of the raw gas supply channel 14 and the raw gas channel 15.

The raw gas channel 15 has a structure such that the channel is bifurcated at an upstream of an entrance of the anode electrode 2b of the fuel cell 2 into a fuel cell entrance channel 15a and a fuel cell bypass channel 15b. The fuel cell entrance channel 15a is connected to the entrance of the anode electrode 2b of the fuel cell 2, and an off-gas channel 15c is connected to an exit of the anode electrode 2b. A side of the off-gas channel 15c that is not connected to the fuel cell 2 is connected to the fuel cell bypass channel 15b of the raw gas channel 15. Moreover, the fuel cell bypass channel 15b is provided with a fuel cell bypass valve 16; the fuel cell entrance channel 15a is provided with a fuel cell entrance valve 17; and the off-gas channel 15c is provided with a fuel cell exit valve 18. The control unit 5 controls opening and closing of the fuel cell bypass valve 16, the fuel cell entrance valve 17, and the fuel cell exit valve 18, thereby switching the raw gas channel 15 between the fuel cell entrance channel 15a and the fuel cell bypass channel 15b. Further, the raw gas channel 15 is connected to the burner unit 12 at a downstream position where the fuel cell bypass channel 15b and the off-gas channel 15c are connected to each other.

Further, the raw gas supply channel 14 is connected, as required, to a steam channel 4a for supplying steam from the steam generator 4 to the reforming unit 9 while the steam is mixed in the raw gas.

The fuel processor 3 used in the fuel cell system of the first embodiment of the present invention is hereunder described by reference to FIG. 2.

Figure 2:
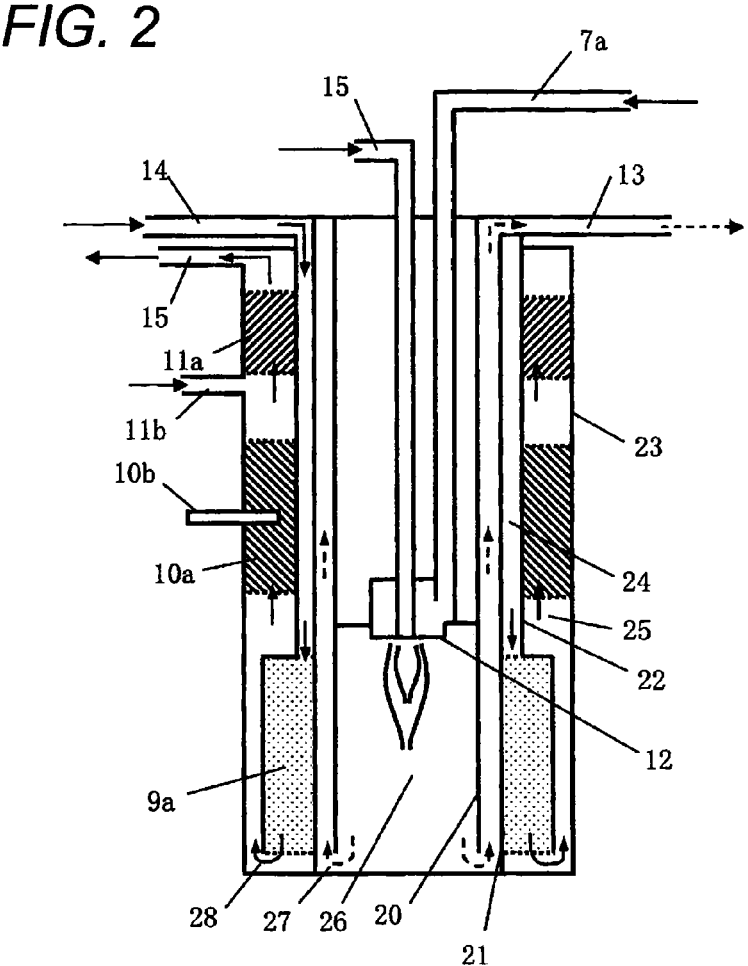
FIG. 2 is a cross sectional view of a main portion for explaining a fuel processor used in the fuel cell system of the first embodiment.

FIG. 2 is a cross sectional view of a main portion for explaining the fuel processor 3 used in the fuel cell system 1 of the first embodiment of the present invention.

As shown in FIG. 2, the fuel processor 3 has a first cylindrical body 20, a second cylindrical body 21, a third cylindrical body 22, and a fourth cylindrical body 23 that are arranged in sequence from inside and in a substantially concentric pattern. The combustion exhaust gas channel 13 is formed from a space between the first cylindrical body 20 and the second cylindrical body 21; a first gas flow channel 24 is formed into an annular shape within a space between the second cylindrical body 21 and the third cylindrical body 22; and a second gas flow channel 25 is formed from a space between the third cylindrical body 22 and the fourth cylindrical body 23. Moreover, disposed in an interior space of the first cylindrical body 20 are the burner unit 12, the raw gas channel 15 for supplying the burner unit 12 with a raw gas and an off-gas, the combustion air channel 7a, and a combustion chamber 26. The combustion chamber 26 and the combustion exhaust gas channel 13 are in mutual communication with each other by way of an exhaust return portion 27 placed in the vicinity of an end of the combustion chamber. Likewise, the first gas flow channel 24 and the second gas flow channel 25 are in mutual communication with each other by way of a raw gas return portion 28 disposed in the vicinity of an end of the first gas flow channel 24 and the second gas flow channel 25.

The first gas flow channel 24 is provided with the reforming unit 9 filled, for example, with the spherical reforming catalyst 9a that contains metal ruthenium carried by an alumina carrier. On top of the metal ruthenium, a nickel catalyst, a platinum-based catalyst, a platinum-group catalyst, such as rhodium, etc., can also be used as the reforming catalyst 9a. Further, on top of the spherical shape, another shape, such as a cylindrical shape, can also be used as a shape of the reforming catalyst 9a.

The second gas flow channel 25 is also provided with the shift unit 10 filled with a shift catalyst 10a, for example, a Cu—Zn-based shift catalyst (MDC-7 manufactured by Sudchemie Co., Ltd. in particular), and the selective oxidation unit 11 filled, for example, with a spherical ruthenium-based selective oxidation catalyst 11a. A platinum-based catalyst except for the above-described catalysts can also be used as the shift catalyst 10a and the selective oxidation catalyst 11a.

The selective oxidation unit 11 is connected to a selective oxidation air supply channel 11b for letting the selective oxidation catalyst 11a effect oxidation reaction. Moreover, the raw gas supply channel 14 is connected to an upper portion of the first gas flow channel 24. Although the embodiment has been described by reference to an example that uses, as the selective oxidation unit 11, a selective oxidation unit 11 that decreases a concentration of carbon monoxide by means of selective oxidation reaction, there may also be adopted a method for decreasing the concentration of carbon monoxide, for example, by a methanation reaction.

The shift unit 10 is provided with a shift temperature sensor 10b for measuring a temperature of the shift catalyst 10a. The shift temperature sensor 10b can be used at the start-up operation of the fuel cell system 1 also for a case where the control unit 5 estimates an amount of desorbed raw gas desorbed from the raw gas adsorbed to the shift catalyst 10a, according to a detected temperature of the shift catalyst 10a.

An exterior of the fuel processor 3 is covered with an unillustrated heat insulator. Thus, the heat insulator is provided so as to accomplish a temperature balance to be described later, in consideration of heat insulation of units.

Figure 3:
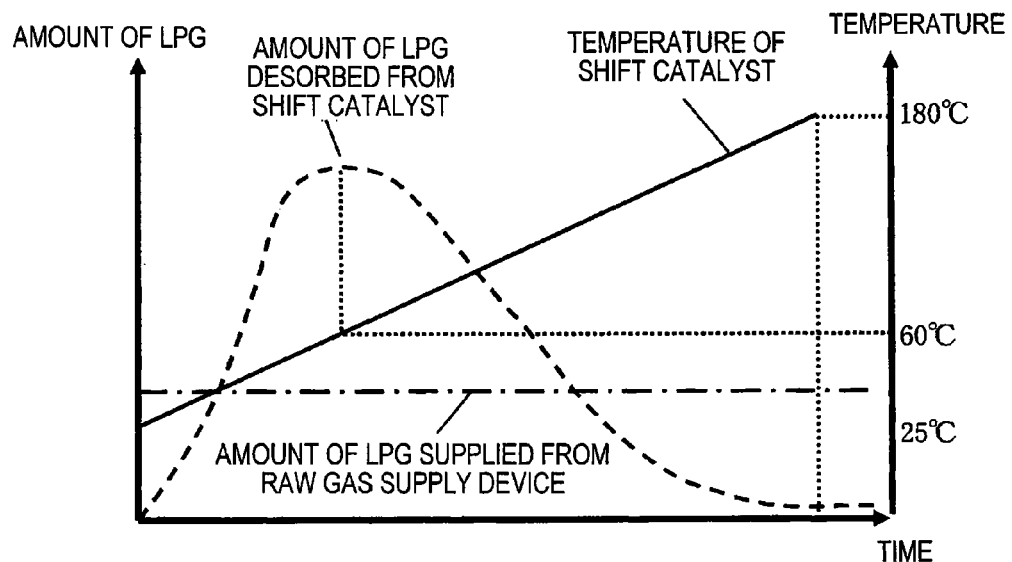
FIG. 3 shows a view for explaining a relationship between a temperature of a shift catalyst of the shift unit of the fuel cell system of the first embodiment and an amount of a desorbed raw gas desorbed from the shift catalyst.

By reference to FIG. 3, the following is provided for explaining the point of the embodiment; namely, a relationship between the temperature of the shift catalyst 10a of the shift unit 10 of the fuel cell system 1 and an amount of desorbed raw gas desorbed from the shift catalyst 10a.

FIG. 3 is a view showing a relationship between a temperature of the shift catalyst 10a of the shift unit 10 of the fuel cell system 1 of the first embodiment of the present invention and an amount of desorbed raw gas desorbed from the shift catalyst 10a.

FIG. 3 shows a test result obtained by: using a fuel processor 3 which is experimentally formed such that only the shift unit 10 is filled with the shift catalyst 10a; supplying a given amount of LPG from the raw gas supply device 6 directly to the burner unit 12 and burning the LPG along with a predetermined combustion air, thereby heating the shift catalyst 10a by a resultant combustion exhaust gas; and measuring, with time, the temperature of the shift catalyst 10a and the amount of LPG as a desorbed raw gas desorbed from the shift catalyst 10a. The test result corresponds to a measurement result. As used herein, the LPG as a desorbed raw gas is referred to as a "desorbed LPG" as necessary.

A horizontal axis shown in FIG. 3 represents a time elapsed since heating of the shift catalyst 10a was started. A first vertical axis represents an amount of an desorbed LPG, and a second vertical axis represents a temperature of the shift catalyst 10a. A broken line shown in FIG. 3 represents the amount of the desorbed LPG desorbed from the shift catalyst 10a, and a solid line represents the temperature of the shift catalyst 10a. In FIG. 3, the amount of LPG supplied by the raw gas supply device 6 is designated by a one-dot broken line for comparison with the amount of desorbed LPG desorbed from the shift catalyst 10a.

As shown in FIG. 3, when heating of the shift catalyst 10a is started, the temperature of the shift catalyst 10a that was nearly equal to an outside air temperature; namely, about 25° C., gradually increases at a substantially given rate. With a temperature rise of the shift catalyst 10a, an LPG, which will be a desorbed LPG, begins to be desorbed from the shift catalyst 10a, and the amount of desorbed LPG keeps increasing up to a temperature of about 60° C. Subsequently, the amount of desorbed LPG gradually decreases during a course of the temperature of the shift catalyst 10a increasing up to a temperature of about 180° C. However, the LPG is kept being discharged.

For this reason, according to the test result shown in FIG. 3, a correlation between the temperature of the shift catalyst 10a and the amount of desorbed LPG desorbed from the shift catalyst 10a is stored in the form of a calculation formula in the control unit 5. The amount of desorbed LPG is estimated from the temperature of the shift catalyst 10a detected by the shift temperature sensor 10b.

The amount of LPG adsorbed to the shift catalyst 10a changes according to the amount of shift catalyst 10a filled and the shape and type of the shift catalyst 10a. Even when a hydrocarbon-based raw gas, like a city gas, is used, an amount of gas adsorbed to the shift catalyst 10a varies. Further, since the shift temperature sensor 10b measures a portion of the temperature of the shift catalyst 10a, the temperature and the amount of desorbed raw gas varies according to the position of the shift temperature sensor 10b. In order to address the change, it is important to previously determine the relationship between the temperature of the shift catalyst 10a and the amount of desorbed raw gas desorbed from the shift catalyst 10a and to store the thus-re-measured relationship in the control unit 5.

As in the case of the shift catalyst 10a, it is possible to measure the amount of desorbed LPG desorbed from the reforming catalyst 9a and the selective oxidation catalyst 11a by means of heating the reforming catalyst 9a or the selective oxidation catalyst 11a. The amount of desorbed LPG desorbed from the reforming catalyst 9a and the selective oxidation catalyst 11a can be estimated by means of previously storing in the control unit the relationship among the temperature of the reforming catalyst 9a, the temperature of the selective oxidation catalyst 11a, and the amount of desorbed LPG, according to the measurement result. However, very little LPG serving as a raw gas is adsorbed to the reforming catalyst 9a or the selective oxidation catalyst 11a used in the embodiment. Further, the amount of desorbed LPG desorbed with the temperature rise is sufficiently smaller than the amount of LPG supplied from the raw gas supply device 6.

For these reasons, control is performed while taking as a principal parameter the amount of desorbed raw gas desorbed from the shift catalyst 10a.

Operation and an advantage of the fuel cell system 1 having the foregoing configuration are hereunder described by reference to FIGS. 1 and 2.

Operation of the fuel cell system 1 performed during normal power generation is first described.

First, the raw gas supply device 6 supplies an LPG that is a raw gas mixed with the steam supplied from the steam generator 4, to the reforming unit 9 in which the temperature of the reforming catalyst 9a is maintained at about 700° C. A reformed gas including hydrogen, carbon monoxide, and steam is generated by means of steam reforming reaction and by way of the reforming catalyst 9a of the reforming unit 9.

Next, the reformed gas exited from the reforming unit 9 is supplied to the layer filled with the shift catalyst 10a of the shift unit 10 and is circulated through the filled layer from down to up. By virtue of action of the shift catalyst 10a maintained at about 200 to 300° C., shift reaction for generating carbon dioxide and hydrogen from the carbon monoxide and steam included in the reformed gas takes place at this time. The concentration of carbon monoxide in the reformed gas is thereby decreased to about 0.5% or less.

The reformed gas exited from the shift unit 10 is separately supplied to the layer filled with the selective oxidation catalyst 11a of the selective oxidation unit 11 along with a small amount of air supplied by way of the selective oxidation air supply channel 11b, and the reformed gas is circulated through the filled layer from down to up. By virtue of action of the selective oxidation catalyst 11a maintained at about 100 to 200° C., the carbon monoxide in the reformed gas is subjected to oxidation at this time. The concentration of carbon monoxide in the reformed gas is further decreased to 10 ppm or less.

Next, the reformed gas exited from the selective oxidation unit 11 passes through the raw gas channel 15 in which the fuel cell bypass valve 16 is closed and in which the fuel cell entrance valve 17 and the fuel cell exit valve 18 are open, to thus be supplied toward the anode electrode 2b of the fuel cell 2. The off-gas exhausted as a result of a portion of hydrogen in the reformed gas being consumed by power generation and the air supplied by the combustion air fan 7 are supplied to the burner unit 12, and the gas and the air are burnt by the burner unit 12. The reforming catalyst 9a is heated by combustion heat of the off-gas and maintained at about 700° C. The combustion exhaust gas circulates through the inside channel in the shift unit 10 and the selective oxidation unit 11, whereby the shift catalyst 10a is maintained at about 200 to 300° C., and the selective oxidation catalyst 11a is maintained at 150 to 200° C.

In the meantime, air is supplied toward the cathode electrode 2c of the fuel cell 2 by means of the cathode air blower 8. A portion of oxygen in the air is consumed by power generation, and exhaust air is caused to exit outside from the fuel cell system 1.

Electric power generated by the fuel cell 2 is consumed by an unillustrated external load.

Operation of the fuel cell system 1 performed at the time of power-generation halt operation is hereunder described.

First, after a connection between the fuel cell 2 and the external load is disconnected, supplying air to the fuel cell 2 by the cathode air blower 8 and supplying the raw gas by the raw gas supply device 6 are stopped. Concurrently, the fuel cell bypass valve 16, the fuel cell entrance valve 17, and the fuel cell exit valve 18 are closed. The steam generator 4 is also simultaneously stopped at this time, whereby supplying steam to the raw gas supply channel 14 by way of the steam channel 4a is also stopped.

Next, when the temperature of the reforming catalyst 9a is cooled to about 300° C. by outside air after elapse of a predetermined period of time, the fuel cell bypass valve 16 is opened, whereby the raw gas supply device 6 sequentially supplies an LPG, which is the raw gas, to the reforming unit 9, the shift unit 10, and the selective oxidation unit 11. The reformed gas containing steam in the respective layers filled with the respective catalysts is thereby purged. Since the temperature of the shift catalyst 10a and the temperature of the selective oxidation catalyst 11a are 100° C. or more at this time, the steam in the reformed gas will not condense on surfaces of the respective catalysts. Subsequently, after the LPG has been supplied for a predetermined period of time that makes it possible to sufficiently purge the reformed gas containing steam from the respective layers filled with the respective catalysts by means of the LPG, the fuel cell bypass valve 16 is closed, thereby stopping the raw gas supply device 6.

Further, when the fuel processor 3 is cooled as a result of having dissipated heat for reasons of a difference between the temperature of the fuel processor and a temperature of an ambient atmosphere, internal pressure of the fuel processor 3 decreases for reasons of volume shrinkage of the LPG heated in the fuel processor 3. However, the raw gas supply device 6 supplies the LPG at predetermined times, whereupon the internal pressure of the fuel processor 3 is maintained at positive pressure. Operation for supplying the fuel processor 3 with an LPG to maintain positive pressure is hereunder described as pressure keeping operation, as required.

By means of purging and pressure keeping operations, the LPG is adsorbed to the shift catalyst 10a whose temperature dropped sufficiently. Since in reality the town gas and the LPG are a mixed gas containing hydrocarbon-based gas components, such as methane or propane, ease of adsorption to the catalyst changes according to the respective hydrocarbon-based gases. Specifically, a hydrocarbon-based gas component of higher molecular weight tends to be adsorbed more easily than does a hydrocarbon-based gas component of smaller molecular weight. However, since propane serving as a major component accounts for about 98% of the composition of the LPG employed in the present embodiment, there will arise no problem even when the LPG is handled as a gas substantially containing a single component, or propane. Accordingly, a component of the raw gas adsorbed to the shift catalyst 10a is also described as a raw gas.

The start-up operation of the fuel cell system 1 of the present embodiment is hereunder described by reference to the drawings.

Figure 4:
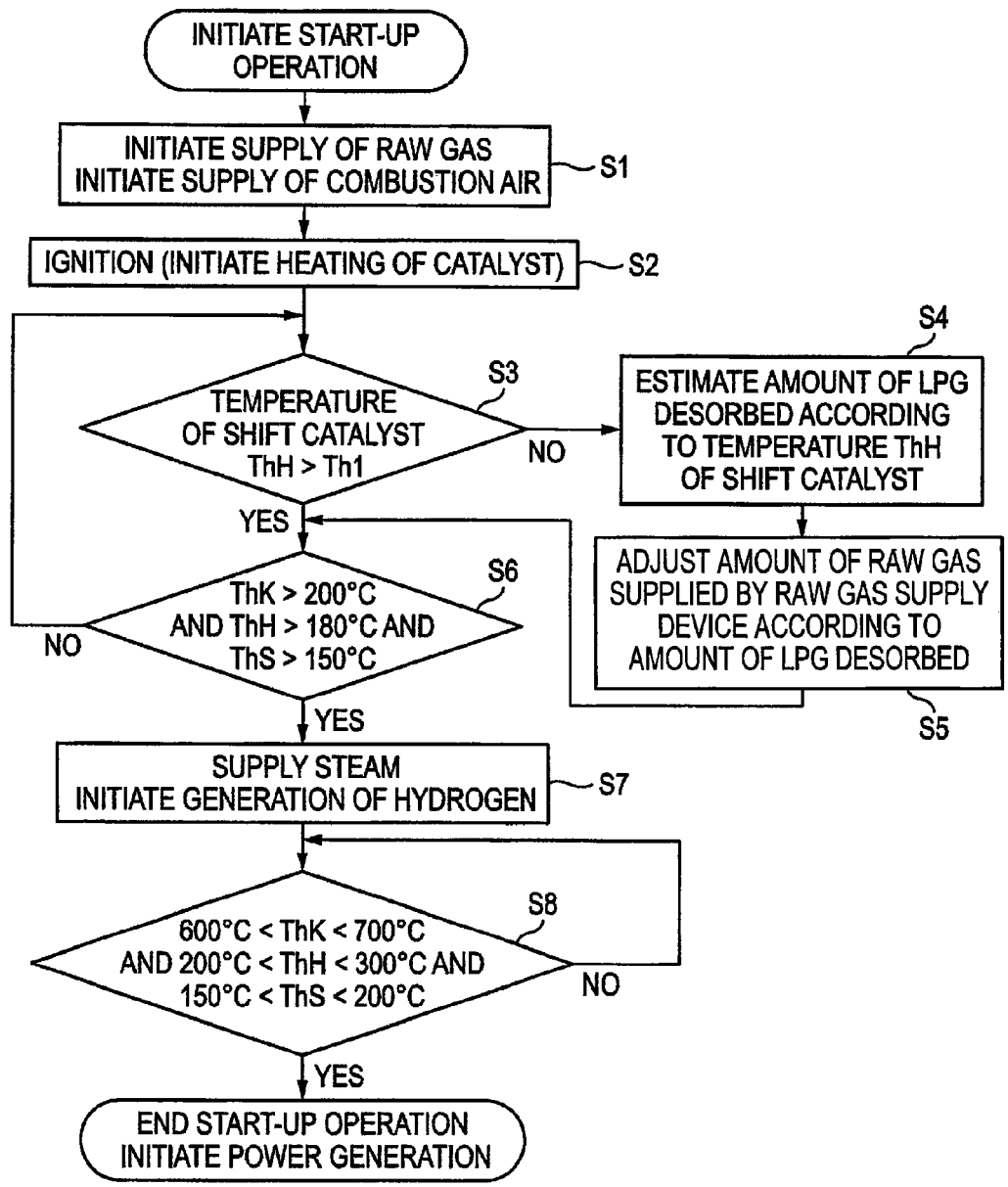
FIG. 4 is a flowchart showing control flow of a main portion at the start-up operation of the fuel cell system of the first embodiment.

FIG. 4 is a flowchart showing control flow of a main portion at the start-up operation of the fuel cell system 1 of the first embodiment of the present invention.

As shown in FIG. 4, at the start-up operation of the fuel cell system 1, the fuel cell bypass valve 16 is first opened, to thus supply the reforming unit 9 with a predetermined amount of LPG that is a raw gas (step S1). Subsequently, the LPG sequentially circulates through the shift unit 10 and the selective oxidation unit 11 and is supplied to the burner unit 12 by way of the fuel cell bypass channel 15b of the raw gas channel 15. Concurrently, the combustion air fan 7 sends the burner unit 12 with an amount of air in accordance with the flow amount of LPG supplied by the raw gas supply device 6 (step S1), and the LPG is ignited by an igniter not shown (step S2).

When the burner unit 12 starts burning the LPG, the reforming catalyst 9a of the reforming unit 9 is heated by resultant combustion heat, whereupon the temperature (ThK) of the reforming catalyst 9a increases. Concurrently, a combustion exhaust gas sequentially passes through the combustion exhaust gas channel 13 in the shift unit 10 and the selective oxidation unit 11, whereby the shift catalyst 10a and the selective oxidation catalyst 11a are heated. The temperature (ThH) of the shift catalyst 10a and a temperature (ThS) of the selective oxidation catalyst 11a are thereby increased.

Next, the shift temperature sensor 10b detects the temperature (ThH) of the shift catalyst 10a, thereby comparing the thus-detected temperature with a predetermined temperature (Th1) (step S3). At this time, when the temperature (ThH) of the shift catalyst 10a is lower than the predetermined temperature (Th1) (No in step S3), the amount of LPG which will be desorbed to become a desorbed raw gas, among the LPG adsorbed to the shift catalyst 10a, is estimated from the information stored in the control unit 5 (step S4).

A total amount of the LPG supplied to the burner unit 12 by the raw gas supply device 6 and the amount of desorbed LPG that is a desorbed raw gas which will be desorbed by heat-up of the catalysts, to thus be supplied to the burner unit 12, is adjusted so as to assume an appropriate ratio with respect to the amount of combustion air supplied to the burner unit 12 by the combustion air fan 7. Specifically, the amount of raw gas supplied from the raw gas supply device 6 to the burner unit is adjusted according to the amount of desorbed LPG in such a way that the ratio of the amount of raw gas to the amount of combustion air comes to a predetermined amount (step S5).

An appropriate ratio of the amount of LPG supplied to the burner unit 12 (or the amount of reformed gas or the amount of off-gas) to the amount of air is a predetermined multiple of the amount of air including the amount of oxygen required to completely burn the LPG (or the reformed gas or off-gas) supplied to the burner unit, to thus split the LPG into carbon dioxide and water (steam). A ratio of the amount of air to the amount of LPG is hereunder described as an air-fuel ratio. Specifically, for example, a air-fuel ratio of 1.0 is a ratio at which, when oxygen in a supplied air and LPG are ideally burnt, the LPG is split into carbon dioxide and water in just proportion. For example, an air-fuel ratio of 2.0 is a ratio at which one-half of the oxygen in the supplied air is unused for combustion and still remains in a combustion exhaust gas.

In the fuel cell system 1 of the present embodiment, the air-fuel ratio in steps S1 and S5 is set to 2.5 to 3.0. If the air-fuel ratio is too large or small, ignitability will be deteriorated. Even if the LPG is ignited, incomplete combustion will take place, thereby producing carbon monoxide. The carbon monoxide will be discharged outside the fuel cell system 1 as a combustion exhaust gas, which will cause a flame vanish.

Adjustment of the amount of raw gas by means of the raw gas supply device 6 according to the temperature detected by the shift temperature sensor 10b (step 5) is continually performed until the temperature (ThH) of the shift catalyst 10a comes to the predetermined temperature (Th1) or more (Yes in step S3), the temperature (ThK) of the reforming catalyst 9a comes to 200° C. or more, the temperature (ThH) of the shift catalyst 10a comes to 180° C. or more, and the temperature (ThS) of the selective oxidation catalyst 11a comes to 150° C. or more (Yes in step S6).

Next, when the temperature (ThK) of the reforming catalyst 9a comes to 200° C. or more, when the temperature (ThH) of the shift catalyst 10a comes to 180° C. or more, and when the temperature (ThS) of the selective oxidation catalyst 11a comes to 150° C. or more (Yes in step S6), the steam generating device 4 starts supplying steam to the raw gas supply channel 14 by way of the steam channel 4a. A mixed gas containing an LPG and steam is supplied to the layer filled with the reforming catalyst 9a of the reforming unit 9, whereupon reforming the LPG into hydrogen is started (step S7). The amount of raw gas is adjusted such that the air-fuel ratio comes to 1.5 to 2.0. If steam is supplied when none of the temperature of the reforming catalyst 9a, the temperature of the shift catalyst 10a, and the temperature of the selective oxidation catalyst 11a exceed 100° C., the steam will condense, which may hinder a gas flow. For this reason, the requirements to select Yes in step S6; namely, the temperature (ThK) of the reforming catalyst 9a being 200° C. or more, the temperature (ThH) of the shift catalyst 10a being 180° or more, and the temperature (ThS) of the selective oxidation catalyst 11a being 150° C. or more, correspond to a temperature of a temperature sensor at which temperatures of all of the catalysts having temperature distributions come to 100° C. or more. Moreover, if steam is not supplied when the temperature of the reforming catalyst 9a exceeded 400° C., carbon will be deposited on the surface of the reforming catalyst, which may deteriorate the function of the catalyst. For this reason, there is a necessity for a design consideration such that the temperature (ThH) of the shift catalyst 10a and the temperature (ThS) of the selective oxidation catalyst 11a exceed 100° C. before the temperature (ThK) of the reforming catalyst 9a exceeds 400° C.

A determination is now made as to whether or not the respective catalysts are at respective predetermined temperatures; namely, whether or not the reforming catalyst 9a falls in a temperature range from about 600 to 700° C.; whether or not the shift catalyst 10a falls within a temperature range from about 200 to 300° C., and whether or not the selective oxidation catalyst 11a falls within a temperature range from about 150 to 200° C. (step S8). When the temperatures of the respective catalysts are lower than their respective temperature ranges (No in step S8), reactions of the respective catalysts are insufficient. Namely, since the amount of hydrogen in the reformed gas is small and since the amount of carbon monoxide is large, the reformed gas in middle of heat-up is caused to circulate through the fuel cell bypass channel 15b. When the temperatures of the respective catalysts have increased to respective predetermined temperature ranges (Yes in step S8), the fuel cell bypass valve 16 is closed after the components of the reformed gas have become stable. Concurrently, the reformed gas is supplied to the anode electrode 2b of the fuel cell 2 by opening the fuel cell entrance valve 17 and the fuel cell exit valve 18, and power generation is started. When the temperatures of the respective catalysts are outside the respective temperature ranges (No in step S8), control similar to that performed in the related art is performed, and processing waits until the temperatures fall in the respective temperature ranges.

As mentioned above, at the start-up operation, the fuel cell system 1 of the first embodiment estimates desorption of raw gas due to the temperature rise of the shift catalyst according to the temperature of the shift catalyst 10a detected by the shift temperature sensor 10b and adjusts the amount of raw gas supplied from the raw gas supply device 6 according to the thus-estimated value. A ratio of combustion air supplied from the combustion air fan to the raw gas is thereby controlled so as to assume a predetermined air-fuel ratio, whereby the combustion air and the raw gas can be supplied to and burnt in the burner unit 12. As a consequence, occurrence of incomplete combustion is prevented, to thus effect stable combustion, and the start-up operation of the fuel cell system 1 can be performed reliably.

Figure 5:
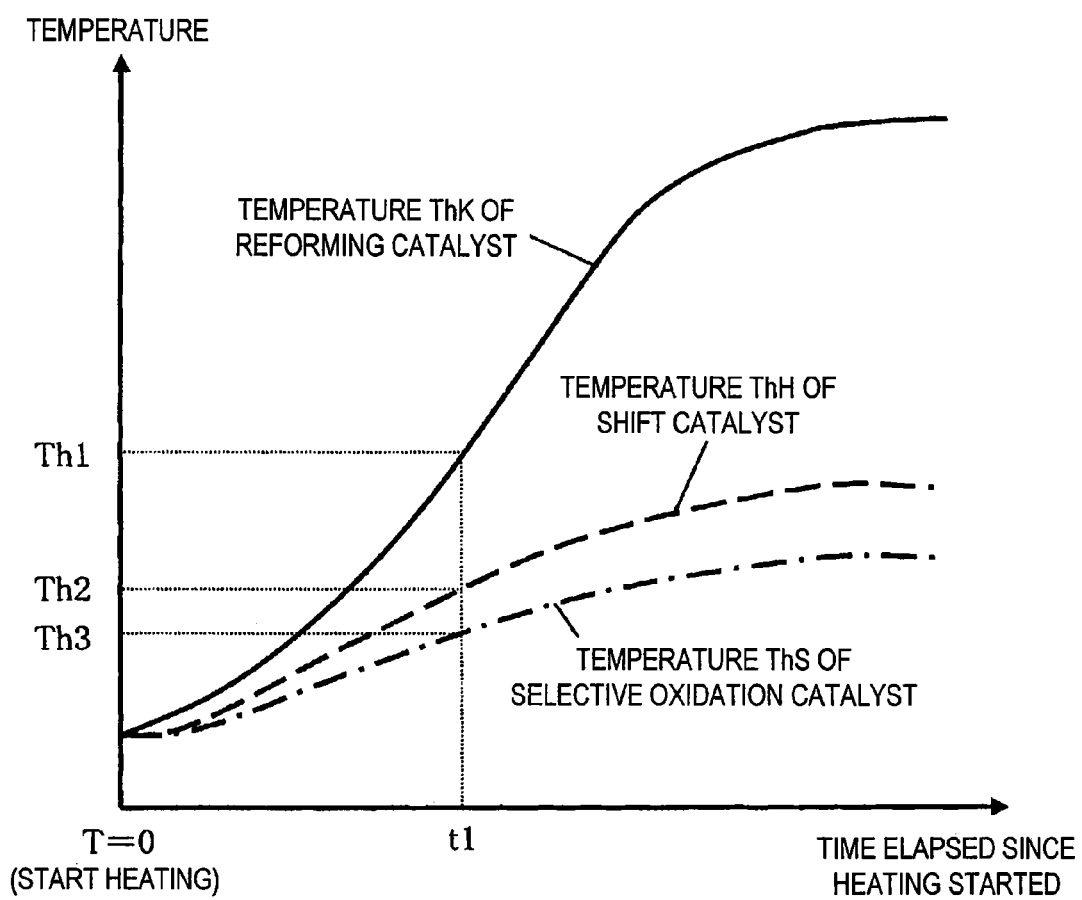
FIG. 5 is a diagram showing a temperature rise in a reforming catalyst, the shift catalyst, and a selective oxidation catalyst at the start-up operation of the fuel cell system of the first embodiment.

The fuel cell system 1 of the present embodiment has been described by reference to the example in which the amount of desorbed LPG desorbed from the shift catalyst 10a at the start-up of the fuel cell system 1 is estimated from a value of the shift temperature sensor 10b that detects the temperature of the shift catalyst 10a. However, the fuel cell system is not limited to such an example. For example, as shown in FIG. 5, the temperature of the shift catalyst 10a is estimated by means of a timer that measures a time (t1) elapsed since heating was started. The amount of desorbed LPG desorbed from the shift catalyst 10a can also be further estimated from the thus-estimated temperature. A method for assuming the amount of LPG is hereunder described specifically by reference to FIG. 5.

FIG. 5 is a diagram showing how the temperature of the reforming catalyst 9a, the temperature of the shift catalyst 10a, and the temperature of the selective oxidation catalyst 11a increase at the start-up of the fuel cell system 1 of the embodiment.

As shown in FIG. 5, the temperature (ThK) of the reforming catalyst 9a, the temperature (ThH) of the shift catalyst 10a, and the temperature (ThS) of the selective oxidation catalyst 11a are determined from the time (t1) elapsed since heating of the reforming catalyst 9a, the shift catalyst 10a, and the selective oxidation catalyst 11a was initiated. Therefore, at the start-up of the fuel cell system, the timer first measures the time (t1) elapsed since heating was started, and the temperature of the shift catalyst 10a achieved at that time is estimated. The amount of desorbed LPG desorbed from the shift catalyst 10a is estimated according to the temperature of the shift catalyst 10a. Further, the control unit 5 adjusts and controls the amount of raw gas on the basis of the estimation result. In this case, although it is necessary to obtain the temperature (ThH) of the shift catalyst 10a at the start of the heating operation, a temperature sensor configured to measure the temperature of the reforming catalyst 9a or a temperature sensor configured to measure the temperature of the selective oxidation catalyst 11a can substitute for the use of measuring the temperature (ThH).

The fuel cell system 1 of the present embodiment has been described by means of the example in which there is provided the shift temperature sensor 10b for detecting the temperature (ThH) of the shift catalyst 10a. There are no descriptions about means for detecting the temperature (ThK) of the reforming catalyst 9a and the temperature (ThS) of the selective oxidation catalyst 11a. However, a reform temperature sensor for detecting the temperature of the reforming catalyst 9a and a selective oxidation temperature sensor for detecting the temperature of the selective oxidation catalyst 11a can also be separately provided. Alternatively, the temperature of the reforming catalyst 9a and the temperature of the selective oxidation catalyst 11a can also be detected from the temperature of the shift catalyst 10a detected by the shift temperature sensor 10b.

The fuel cell system 1 of the present embodiment has been described by means of an example in which the amount of raw gas supplied from the raw gas supply device 6 is adjusted by means of increasing and decreasing operations. However, the adjustment of the amount of describe raw gas is not limited to the example. For example, a total of the amount of desorbed raw gas desorbed from the catalysts and the amount of raw gas supplied from the raw gas supply device 6 can also be adjusted by means of increasing and decreasing operations. It thereby becomes possible to change the rate of temperature rise in each of the catalysts. Specifically, when the total amount is decreased, the rate of temperature rise in each of the catalysts is decreased, thereby preventing occurrence of a temperature distribution in each of the catalysts, which would otherwise arise during heat-up operation. Thus, efficiency can be enhanced by average reaction. Moreover, it is possible to prevent a decrease in durability of a structure making up the fuel processor 3 or durability of the respective catalysts, which would otherwise be caused by a sudden temperature change. Conversely, when the total amount is increased, it is possible to increase the rate of temperature rise in each of the catalysts. Hence, a start-up time of the fuel cell system can be shortened.

Another start-up operation method for the fuel cell system 1 of the first embodiment of the present invention is hereunder described by reference to FIG. 6.

Figure 6:
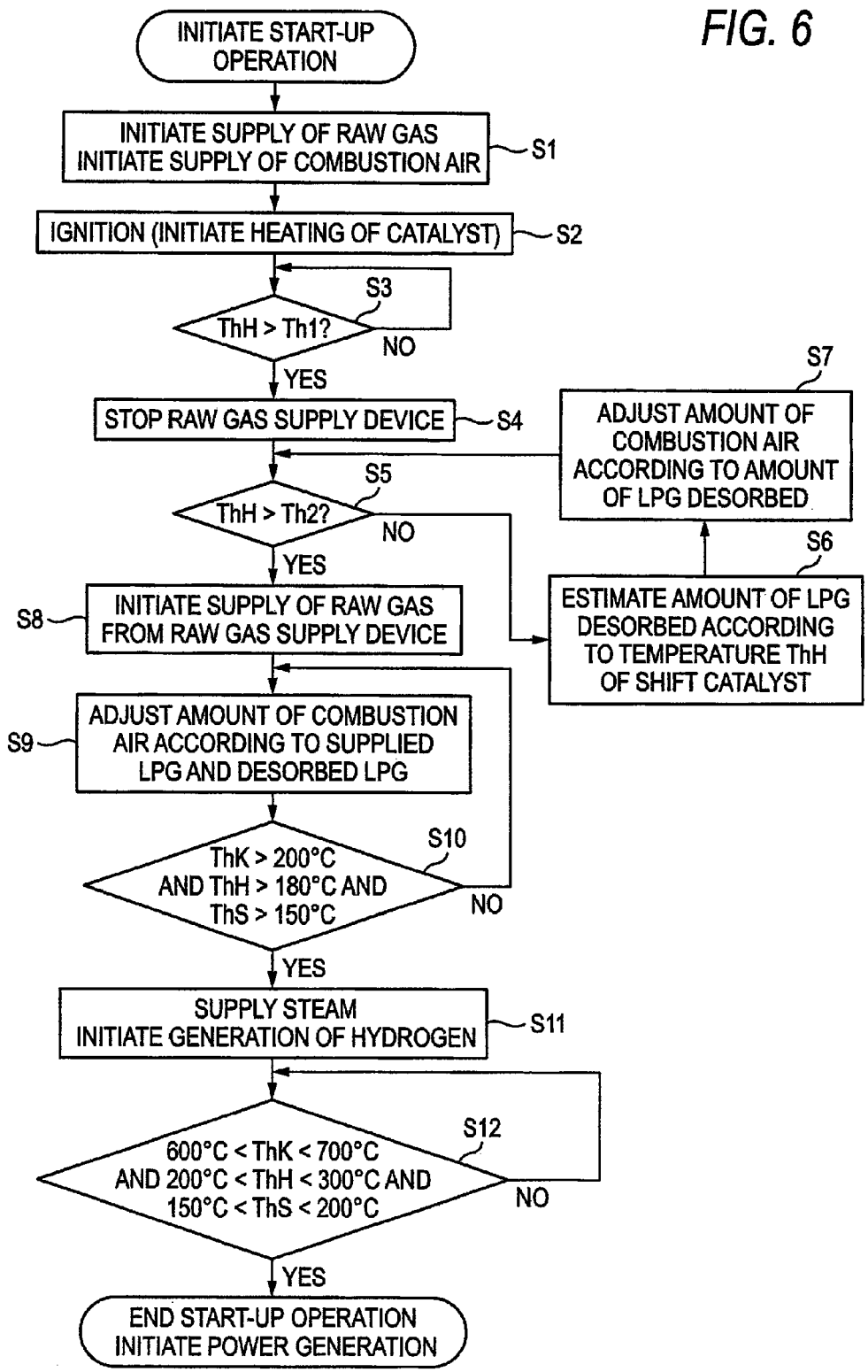
FIG. 6 is a flowchart for describing control flow of the main portion in another start-up operation method for the fuel cell system of the first embodiment.

FIG. 6 is a flowchart for describing control flow of the main portion under another start-up operation method for the fuel cell system 1 of the first embodiment of the present invention.

As shown in FIG. 6, the fuel cell bypass valve 16 is first opened at start-up operation of the fuel cell system 1, thereby activating the raw gas supply device 6 and the combustion air fan 7 and supplying the LPG, which is the raw gas, and air (step S1). The LPG and the combustion air supplied to the burner unit 12 are ignited by the unillustrated igniter, whereby the burner unit starts burning the LPG (step S2).

The temperature (ThH) of the shift catalyst 10a and a predetermined temperature (Th1) are now compared to each other (step S3). When the temperature (ThH) of the shift catalyst 10a exceeds the predetermined temperature (Th1) (Yes in step S3), the raw gas supply device 6 is deactivated (step S4). Although supplying LPG that is a raw gas from the raw gas supply device 6 to the burner unit 12 is suspended at this time, the desorbed LPG desorbed from the shift catalyst 10a is supplied to the burner unit 12; hence, combustion still remains continued.

The temperature (ThH) of the shift catalyst 10a and a predetermined temperature (Th2) are now compared to each other (step S5). When the temperature (ThH) of the shift catalyst 10a is lower than the predetermined temperature (Th2) (No in step S5), the control unit 5 estimates an amount of desorbed LPG, among the LPG adsorbed to the shift catalyst 10a (step S6). The amount of combustion air supplied to the burner unit 12 by the combustion air fan is adjusted so as to assume a flow amount in accordance with the amount of desorbed LPG desorbed from the shift catalyst 10a (step S7).

Moreover, when the temperature (ThH) of the shift catalyst 10a exceeds the predetermined temperature (Th2) (Yes in step S5), the raw gas supply device 6 is re-activated, thereby supplying the LPG from the raw gas supply device 6 to the burner unit 12 (step S8). The amount of combustion air supplied to the burner unit 12 by the combustion air fan 7 and the amount of LPG supplied by the raw gas supply device 6 are adjusted at this time according to the amount of desorbed LPG (step S9).

In this case, adjustment of the amount of LPG that is a raw gas supplied by the raw gas supply device 6 according to the temperature detected by the shift temperature sensor 10b (step S9) is continually performed until the temperature (ThK) of the reforming catalyst 9a comes to 200° C. or more, the temperature (ThH) of the shift catalyst 10a comes to 180° C. or more, and the temperature (ThS) of the selective oxidation catalyst 11a comes to 150° C. or more (Yes in step S10).

When the temperature (ThK) of the reforming catalyst 9a has come to 200° C. or more, when the temperature (ThH) of the shift catalyst 10a has come to 180° C. or more, and when the temperature (ThS) of the selective oxidation catalyst 11a has come to 150° C. or more (Yes in step S10), the steam generating device 4 starts supplying steam to the raw gas supply channel 14 by way of the steam channel 4a. The mixed gas containing the LPG and steam is supplied to the layer filled with the reforming catalyst 9a of the reforming unit 9, whereupon reforming the LPG to hydrogen is started (step S11). The amount of LPG that is a raw gas to be supplied from the gas supply device 6 is adjusted in such a way that the air-fuel ratio comes to 1.5 to 2.0.

A determination is now made as to whether or not the respective catalysts are at respective predetermined temperatures; namely, whether or not the reforming catalyst 9a stays in a temperature range from about 600 to 700° C.; whether or not the shift catalyst 10a stays in a temperature range from about 200 to 300° C.; and whether or not the selective oxidation catalyst 11a stays in a temperature range from about 150 to 200° C. (step S12). When the temperatures of the respective catalysts are lower than their respective temperature ranges (No in step S12), reactions occurred in the respective catalysts are insufficient. Namely, the amount of hydrogen in the reformed gas is small, and the amount of carbon monoxide in the gas is large. Therefore, the reformed gas in the course of heat-up operation is caused to circulate through the fuel cell bypass channel 15b. When the temperatures of the respective catalysts have increased to their predetermined temperature ranges (Yes in step S12), the fuel cell bypass valve 16 is closed after the components of the reformed gas have become stable. Concurrently, the reformed gas is supplied to the anode electrode 2b of the fuel cell 2 by opening the fuel cell entrance valve 17 and the fuel cell exit valve 18, whereupon power generation is started.

As has been described above, under another start-up operation method for the fuel cell system 1 of the first embodiment, the temperature rise of the catalysts can be made gently than the temperature rise shown in FIG. 5 through the processes up to step S8 shown in FIG. 6. It is thereby possible to prevent occurrence of temperature distributions (variations) of the respective layers filled with the respective catalysts. It also becomes possible to prevent deterioration, which would otherwise be caused by drastic temperature changes in the respective catalysts and in the respective cylindrical bodies making up the fuel processor 3.

Under control conforming to another start-up operation of the first embodiment, supplying an LPG from the raw gas supply device 6 is stopped after the temperature of the shift catalyst 10a has reached the predetermined temperature Th1. However, control operation is not limited to the example. As is apparent, for example, from a relationship between the time elapsed after initiation of heating and the temperature of the catalyst shown in FIG. 5, supplying the LPG from the raw gas supply device 6 may also be stopped after elapse of a predetermined period of time since heating of the shift catalyst 10a was started.

The fuel cell system 1 of the present embodiment has been described by means of taking, as an example, a configure in which a raw gas to be burnt by the burner unit 12 at the start-up operation of the fuel cell system 1 is supplied to the burner unit 12 by way of the fuel processor 3. However, the system is not limited to the configuration. For example, the fuel cell system may also be equipped with a channel (not shown) for supplying a raw gas from the raw gas supply device 6 directly to the burner unit 12 and may be configured so as to supply a raw gas directly to the burner unit 12 at the start-up operation of the fuel cell system 1 and burn the thus-supplied gas. In order to suppress a pressure rise due to a temperature rise of the fuel processor 3, it is necessary to provide the raw gas channel from the fuel processor 3 with the burner unit 12. However, in the case of the configuration, a similar advantage can be yielded by estimating the amount of desorbed raw gas desorbed from the catalysts and adjusting the amount of combustion air.

The embodiment has been described by means of taking, as an example, the fuel cell system that adjusts the amount of raw gas supplied from the raw gas supply device 6 targeted solely for the amount of the desorbed raw gas desorbed from the shift catalyst 10a. The reason is that the embodiment is based on a test result showing that a very small amount of LPG which is a raw gas is adsorbed to the reforming catalyst 9a and the selective oxidation catalyst 11a used in the embodiment and that influence of the amount of adsorbed raw gas on the air-fuel ratio is sufficiently small.

However, when the type of a raw gas or the type and shape of a catalyst change, the raw gas is usually adsorbed to the reforming catalyst 9a or the selective oxidation catalyst 11a other than the shift catalyst 10a. There may be a case where influence of the amount of desorbed raw gas, which is desorbed with a temperature rise, on the air-fuel ratio will become greater. In this case, the amount of desorbed raw gas that is desorbed with a temperature rise of a catalyst is first experimentally determined for the reforming unit 9, the shift unit 10, and the selective oxidation unit 11, respectively. The amount of desorbed raw gas desorbed from each of the catalysts is estimated, at the start-up operation of the fuel cell system 1, from the temperature of each of the catalysts. The essential requirement is to adjust the amount of raw gas supplied from the raw gas supply unit 6 according to the amount of desorbed raw gas desorbed from the respective catalysts and perform adjustment such that the air-fuel ratio achieved in the burner unit 12 comes to a predetermined ratio.

(Second Embodiment)

Figure 7:
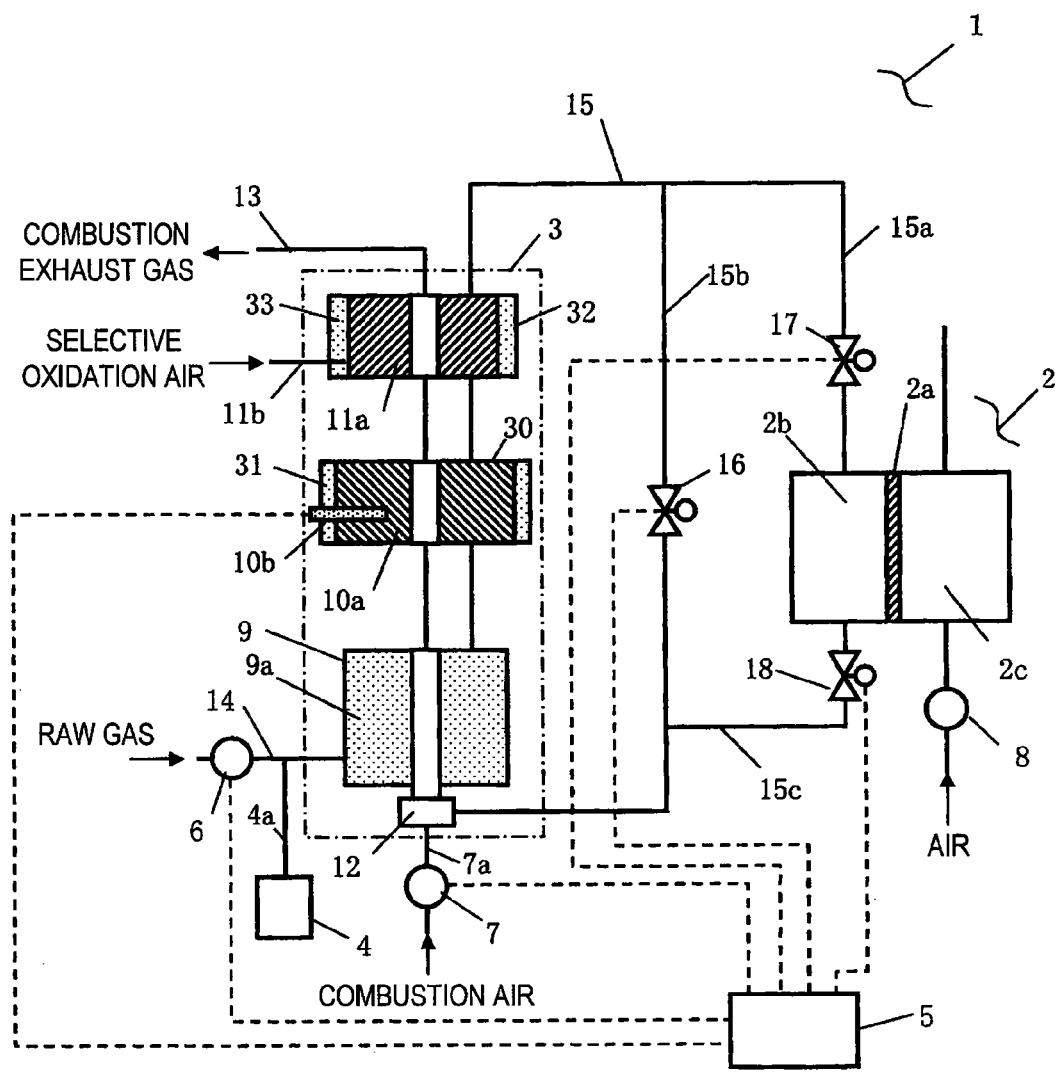
FIG. 7 is a schematic diagram showing a configuration of the fuel cell system of a second embodiment of the present invention.

FIG. 7 is a schematic view showing a configuration of a fuel cell system 1 of a second embodiment of the present invention. In FIG. 7, elements that are the same as those shown in FIG. 1 are assigned the same reference numerals, and their explanations are omitted here for brevity.

As shown in FIG. 7, the fuel cell system 1 of the second embodiment differs from the fuel cell system 1 of the first embodiment in that a shift unit 30 of the fuel cell system described in connection with the first embodiment is equipped with a shift heater 31 and that a selective oxidation unit 32 of the same is equipped with a selective oxidation heater 33.

As shown in FIG. 7, the fuel cell system 1 of the present embodiment is configured such that a shift heater 31 is disposed at a point outside the shift unit 30 where the shift heater does not contact the shift catalyst 10a and that a selective oxidation heater 33 is disposed at a point outside the selective oxidation unit 32 where the selective oxidation heater does not contact the selective oxidation catalyst 11a. The shift heater 31 and the selective oxidation heater 33 are, for example, electric heaters that generate heat upon the application of electric power to thus heat the shift unit 30 or the selective oxidation unit 32.

The start-up operation of the fuel cell system 1 of the second embodiment is hereunder described by reference to FIG. 7 and through use of FIG. 8.

Figure 8:
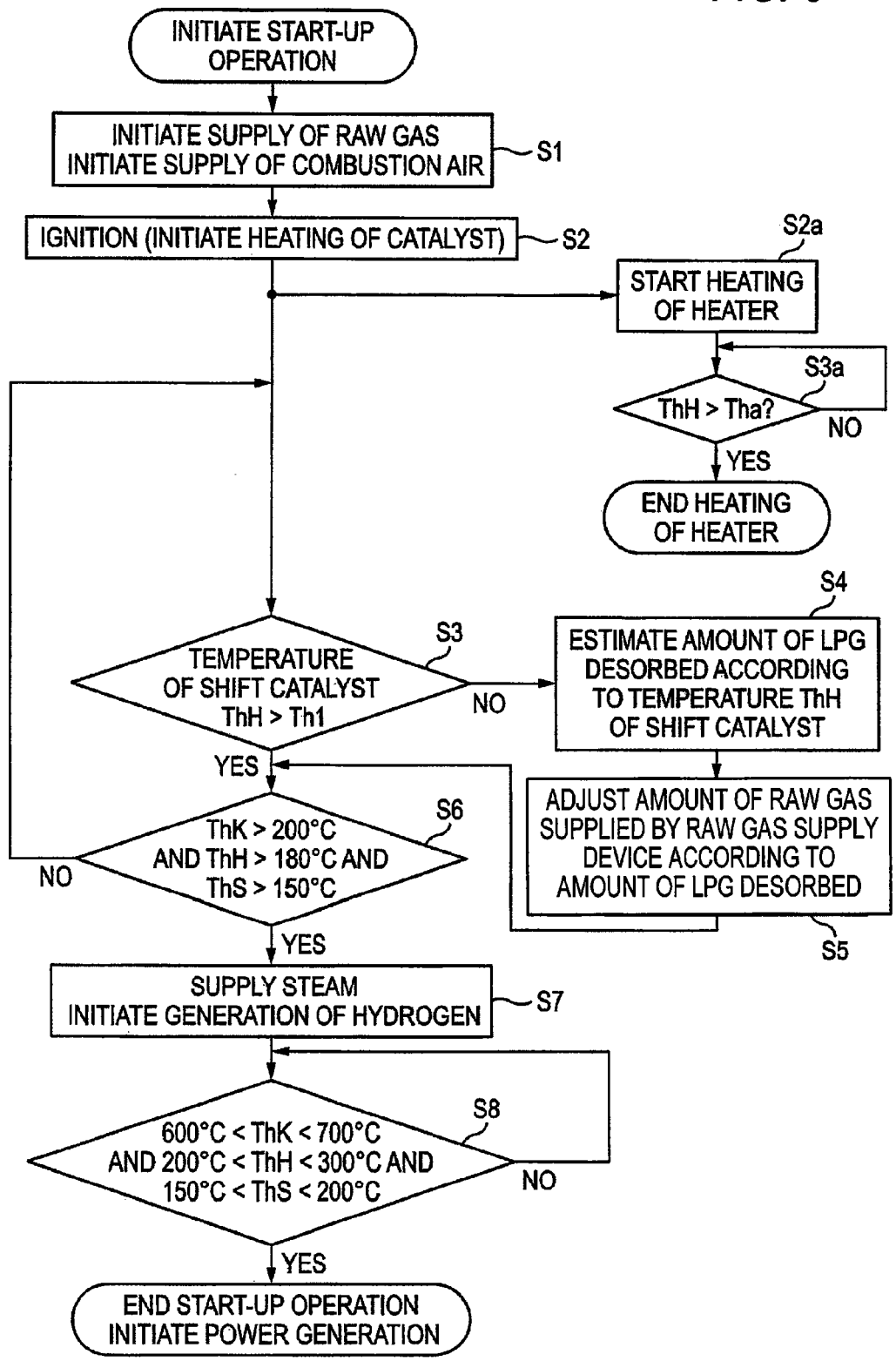
FIG. 8 is a flowchart showing control flow of a main potion at the start-up operation of the fuel cell system of the second embodiment.

FIG. 8 is a flowchart showing control flow of a principal unit performed at the start-up operation of the fuel cell system 1 of the second embodiment of the present invention. Detailed descriptions of elements that are the same as those described in connection with the first embodiment of the present invention are omitted in some cases.

As shown in FIG. 8, at the start-up operation of the fuel cell system 1, the raw gas supply device 6 first supplies an LPG, which is a raw gas, to the burner unit 12, and the combustion air fan 7 supplies combustion air to the burner unit 12 (step S1). In the burner unit 12, the thus-supplied LPG and combustion air are ignited by an igniter not shown (step S2). A combustion exhaust gas sequentially passes through the combustion exhaust gas channel 13 laid in the shift unit 30 that does not directly contact the shift catalyst 10*a* and the selective oxidation unit 31 that does not directly contact the selective oxidation catalyst 11*a,* whereby the shift catalyst 10*a* and the selective oxidation catalyst 11*a* begin to be heated from inside.

At this time, electric power is simultaneously applied to the shift heater 31 and the selective oxidation heater 33, thereby heating the shift catalyst 10*a* and the selective oxidation catalyst 11*a* from the outside as well (step S2*a*). The shift heater 31 and the selective oxidation heater 33 keep heating until the temperature (ThH) of the shift catalyst 10*a* detected by the shift temperature sensor 10*b* reaches a predetermined temperature (Tha) (Yes in step S3*a*). After the temperature (ThH) of the shift catalyst 10*a* has reached or exceeded the predetermined temperature, application of electric power to the shift heater 31 and the selective oxidation heater 33 is suspended, to thus keep performance of heating operation caused by means of only the combustion exhaust gas. The predetermined temperature (Tha) will be described later.

The control unit 5 then compares the temperature (ThH) of the shift catalyst 10*a* with the predetermined temperature (Th1) (step S3). The amount of desorbed LPG desorbed from the shift catalyst 10*a* is assumed from the temperature (ThH) of the shift catalyst 10*a* until the temperature (ThH) of the shift catalyst 10*a* detected by the shift temperature sensor 10*b* exceeds the predetermined temperature (Th1) (No in step S3) (step S4). Further, the amount of LPG that is a raw gas supplied by the raw gas supply device 6 is adjusted according to an estimated amount of desorbed LPG, and the LPG is burnt by the burner unit 12 along with a predetermined amount of combustion air (step S5).

The above-mentioned operation is the same as that described in connection with the first embodiment. However, in the second embodiment, the catalyst 10*a* is heated from both sides; namely, an interior wall and an exterior wall of a double-cylindrical filled layer. Therefore, there may be a case where at the temperature detected by the shift temperature sensor 10*b* a temperature distribution of the shift catalyst 10*a* differs from the temperature distribution achieved in the first embodiment. For this reason, according to the position of the shift temperature sensor 10*b,* in some cases the temperature (ThH) detected by the shift temperature sensor 10*b* and the amount of desorbed LPG desorbed from the shift catalyst 10*a* may change between when the shift heater 31 is provided and when the shift heater 31 is not provided.

The predetermined temperature (Tha) at which the shift heater 31 and the selective oxidation heater 33 continually perform heating operation is first a temperature at which the shift catalyst 10*a* and the selective oxidation catalyst 11*a* remain 100° C. or more; at which steam and the raw gas will not condense even when supplied in a mixed manner; and that is achieved before steam and an LPG are supplied to the fuel processor 3 while mixed together. Specifically, the fuel cell system 1 of the second embodiment performs control operation so as to shut off the application of electric power to the shift heater 31 and the selective oxidation heater 33 when the shift temperature sensor 10*b* has detected about 180° C. In the fuel cell system 1 of the present embodiment, the temperature of the selective oxidation catalyst 11*a* is about 150° C. at this time.

As mentioned above, the fuel cell system 1 of the second embodiment estimates, at the start-up operation, desorption of raw gas due to the temperature rise of the shift catalyst 10*a* according to the temperature of the shift catalyst 10*a* detected by the shift temperature sensor 10*b*. According to the thus-estimated value, the system adjusts the amount of raw gas supplied to the burner unit 12 by the raw gas supply device 6 and supplies combustion air to the burner unit 12 in such a way that the air-fuel ratio of the raw gas to the combustion air supplied by the combustion air fan 7 falls within a predetermined range, thereby letting the burner unit perform burning. As a consequence, occurrence of incomplete combustion is prevented, to thus effect stable combustion, and the start-up operation of the fuel cell system 1 can be performed reliably. Moreover, heating the shift catalyst 10*a* and the selective oxidation catalyst 11*a* to their predetermined temperatures within a short period of time, whereby a rise time of the fuel cell system 1 consumed at the start-up can be shortened.

The fuel cell system 1 of the present embodiment has been described by reference to an example in which the fuel cell system 1 is started by use of the shift heater 31 and the selective oxidation heater 33. However, the start-up operation of the system is not limited to use of the heaters. For example, only the shift heater 31 may also be used without use of the selective oxidation heater 33. In this case, the raw gas circulating through the layer filled with the shift catalyst 10*a* is heated as a result of the shift catalyst 10*a* being heated by the combustion exhaust gas and also as a result of the shift catalyst 10*a* being heated by the shift heater 31. The thus-heated raw gas is supplied to the layer filled with the selective oxidation catalyst 11*a*. Hence, when compared with the case where the shift heater 31 is not provided, the selective oxidation catalyst 11*a* can be heated within a short period of time. As a consequence, use of only the shift heater is effective for building the fuel cell system 1 that is low cost and that is desired to the start up operation in a short period of rise time.

Another start-up operation method for the fuel cell system 1 of the second embodiment of the present invention is hereunder described by reference to FIG. 9.

Figure 9:
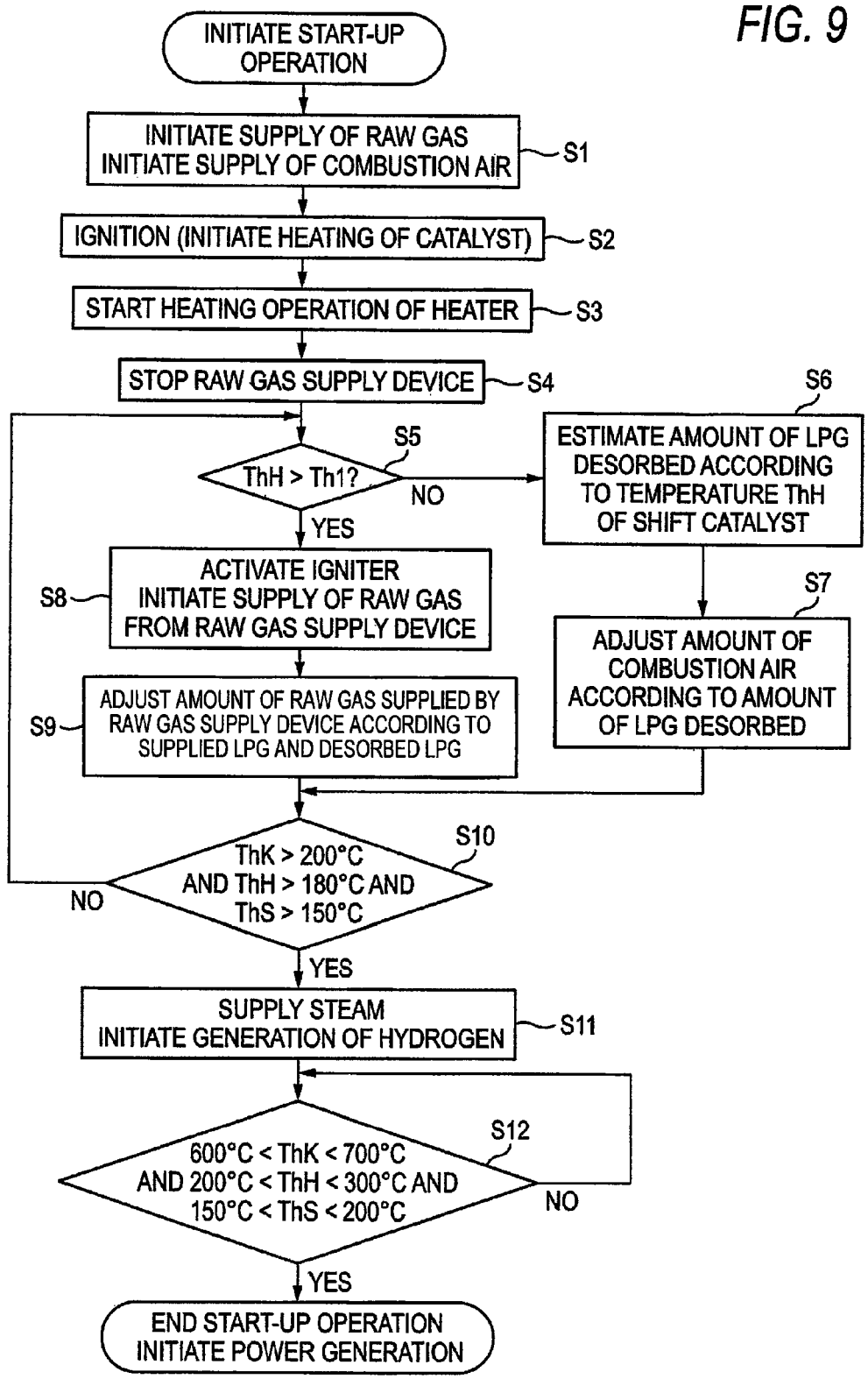
FIG. 9 is a flowchart for describing control flow of the main portion in another start-up operation method for the fuel cell system of the second embodiment.

FIG. 9 is a flowchart for describing control flow of the principal unit achieved under another start-up operation method for the fuel cell system 1 of the second embodiment of the present invention.

As shown in FIG. 9, the fuel cell bypass valve 16 is first opened at the start-up operation of the fuel cell system 1, thereby activating the raw gas supply device 6 and the combustion air fan 7 and supplying the LPG, which is the raw gas, and air (step S1). The LPG and the combustion air are ignited by the igniter not shown, thereby starting burning the LPG (step S2).

Next, after a temperature rise of the shift catalyst 10*a* has been ascertained by the shift temperature sensor 10*b,* applying electric energy to the shift heater 31 and the selective oxidation heater 33 is started, whereby the respective heaters start heating the respective catalysts (step S3). Supplying the raw gas from the raw gas supply device 6 is at this time stopped, thereby burning only the desorbed raw gas desorbed from the shift catalyst 10*a* with the temperature rise of the shift catalyst 10*a* (step S4).

The temperature (ThH) of the shift catalyst 10*a* and a predetermined temperature (Th1) are now compared to each other (step S5). An amount of desorbed LPG desorbed from the shift catalyst 10*a* is first estimated from the temperature of the shift catalyst 10*a* detected by the shift temperature sensor 10*b* (step S6) until the temperature (ThH) of the shift catalyst 10*a* exceeds the predetermined temperature (Th1) (No in step S5). Subsequently, the amount of combustion air supplied by the combustion air fan 7 is adjusted (step S7). The fuel cell system 1 is started and activated along control flow subsequent to step S10 in the same manner as in the other embodiment.

Further, when the temperature (ThH) of the shift catalyst 10*a* exceeds the predetermined temperature (Th1) (Yes in step S5), the raw gas supply device 6 resumes supplying the LPG that is a raw gas after elapse of a predetermined time while the igniter not shown is kept operative at this time (step S8).

Next, the amount of LPG that is a raw to be supplied by the raw gas supply device 6 is adjusted according to the amount of desorbed LPG (step S9).

The fuel cell system 1 starts up and operates along control flow subsequent to step S10 in the same manner as in the other embodiment.

The descriptions have been given by reference to the example in which burning is continually performed through use of only the desorbed LPG desorbed from the shift catalyst 10a until the temperature (ThH) of the shift catalyst 10a reaches the predetermined temperature (Th1). However, a factor for continually performing combustion is not limited to the temperature of the shift catalyst 10a. For example, the temperature (ThH) of the shift catalyst 10a is not measured, and there may also be adopted a predetermined time required before the temperature (ThH) of the shift catalyst 10a reaches the predetermined temperature (Th1). In this case, the raw gas supply device 6 resumes supplying the LPG that is a raw gas while the igniter not shown remains operative when the temperature (ThH) of the shift catalyst 10a comes to the predetermined temperature (Th1) or more or after elapse of a predetermined time (step S8). Control flow subsequent to the step is equivalent to control flow described in connection with the other embodiment. The predetermined temperature (Th1) and the predetermined time refer to a temperature of the shift catalyst 10a at which the flow amount of desorbed LPG desorbed from the shift catalyst 10a becomes sufficiently smaller than the amount of LPG that is a raw gas to be supplied by the raw gas supply device 6 to such an extent that the flow amount of LPG does not greatly affect the air-fuel ratio; and also refers to a time that elapses before the temperature is reached.

According to the second embodiment, a desorbed raw gas among the raw gas adsorbed to shift catalyst 10a is preferentially burnt. Thereby, as compared with a case where the desorbed raw gas is burnt simultaneously with the raw gas supplied from the raw gas supply device 6, the temperature rise of the reforming catalyst 9a can be made milder even when the amount of raw gas supplied by the raw gas supply device 6 is increased. As a result, it is thereby possible to prevent occurrence of variations in temperature distribution of the layer filled with the reforming catalyst 9a, which would otherwise occur when the temperature rise of the reforming catalyst 9a is drastic, or fracture of the reforming catalyst 9a, which would otherwise be caused by stress attributable to a drastic temperature change. As a consequence, it is possible to implement the fuel cell system 1 that performs the stable start-up operation and that reliably operates over a long period of time.

Specifically, at the start-up operation; in particular, when the desorbed raw gas desorbed from the catalyst and the raw gas supplied by the raw gas supply device 6 are burnt in the burner unit 12 while mixed together, it is necessary to sufficiently decrease the amount of raw gas supplied from the raw gas supply device 6. In the meantime, at the time of power generation, it is necessary to supply an amount of raw gas to be a material of a reformed gas required for power generation while a temperature of the reforming catalyst 9a where a reforming reaction, or an endothermic reaction, is performed is maintained at about 700° C. by means of combustion of hydrogen in the off-gas. For these reasons, there is a necessity for the raw gas supply device 6 capable of supplying a raw gas by controlling the flow amount over a wide range, which in turn results in an increase in the size and complexity of the device.

Moreover, according to the embodiment, it is possible to control heat-up of the shift catalyst 10a by means of on/off control of the shift heater 31 and control of a heater output. It is also possible to adjust the amount of desorbed raw gas desorbed from the shift catalyst 10a. Consequently, it is possible to implement the fuel cell system 1 capable controlling the rate of temperature rise of the reforming catalyst 9a by means of a comparatively simple configuration.

The present embodiment has been described by reference to an example comprising supplying an LPG, which is a raw gas, to the burner unit by means of the raw gas supply device 6, igniting the LPG with the igniter to initiate heating the catalyst by means of the heater, suspending an LPG supply from the raw gas supply device 6, and starting burning only the desorbed LPG desorbed from the shift catalyst 10a. However, the embodiment is not limited to the example. For example, first it may also be possible to start heating the shift catalyst 10a by means of the heater and ignite the LPG which will be subsequently desorbed from the shift catalyst. This also yields a similar advantage and a similar working-effect.

In the fuel cell system 1 of the present embodiment, the shift heater 31 and the selective oxidation heater 33 have been described by means of taking electric heaters as example. However, the heaters are not limited to the electric heaters. For example, a heating burner unit that has a configuration similar to that of the burner unit 12 and that is used for heating a catalyst at the start-up operation may also be provided.

An example configuration of the fuel cell system 1 equipped with the heating burner unit 1 is hereunder described by reference to the drawings.

Figure 10:
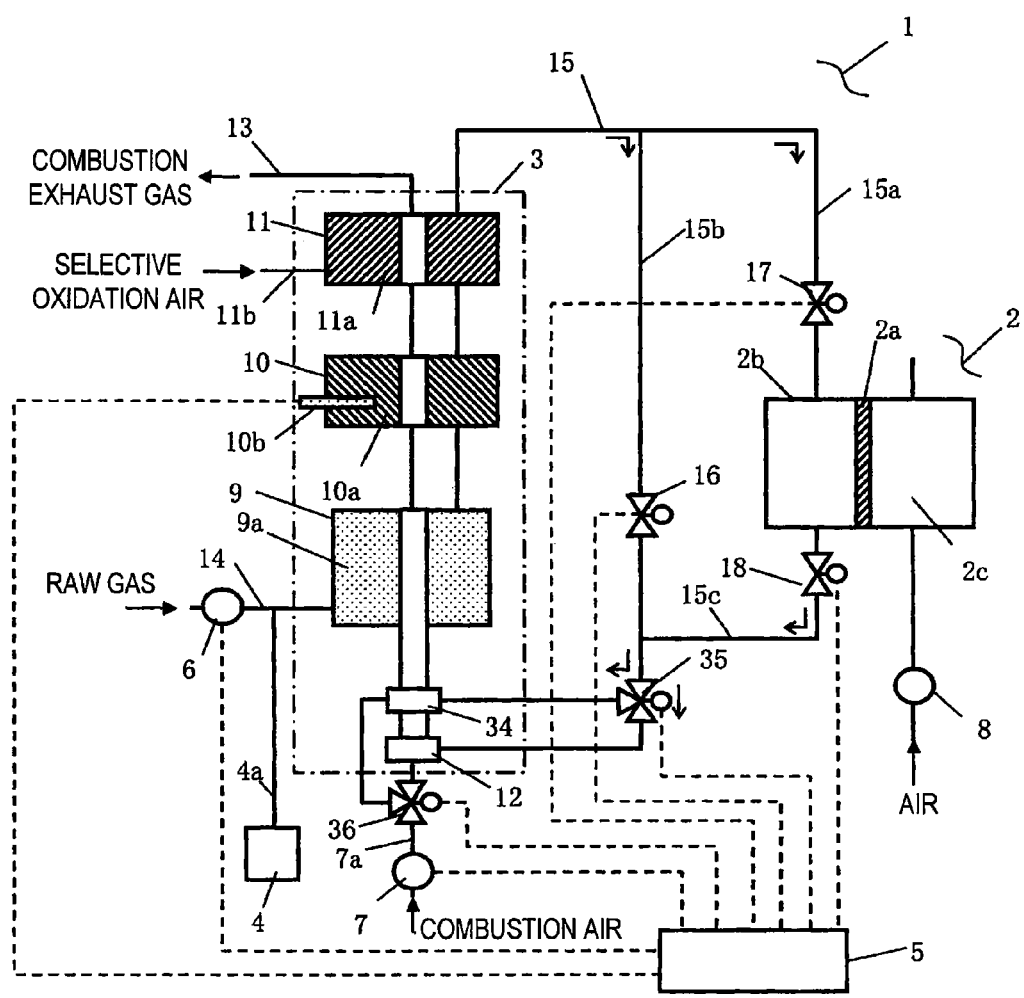
FIG. 10 is a schematic diagram for explaining another example of the fuel cell system of the second embodiment.

FIG. 10 is a schematic diagram for explaining another example of the fuel cell system 1 of the second embodiment of the present invention.

As shown in FIG. 10, the fuel cell system 1 of the second embodiment additionally includes the burner unit 12; a heating burner unit 34; a pre-burner switching valve 35; and a combustion air channel switching valve 36. The pre-burner switching valve 35 switchably supplies the raw gas from the raw gas channel 15 to either the burner unit 12 or the heating burner unit 34 according to a signal from the control unit 5. The combustion air channel switching valve 36 switchably supplies the combustion air to either the burner unit 12 or the heating burner unit 34 according to the signal from the control unit 5. The heating burner unit 34 heats the reforming catalyst 9a, the shift catalyst 10a, and the selective oxidation catalyst 11a by combustion heat and a combustion exhaust gas, as does the burner unit 12.

The heating burner unit 34 can be miniaturized further as compared with the burner unit 12. Further, the heating burner can burn even a small amount of raw gas and enhance control of a rate of temperature rise of each of the catalysts. Therefore, at the start-up operation of the fuel cell system 1 it is possible to control an amount of heat applied to the catalysts with a comparatively superior accuracy by use of the heating burner unit 34.

As mentioned above, according to the embodiment, the rate of temperature rise is controlled with comparatively superior accuracy by additionally providing the heating burner unit 34, whereby the amount of desorbed raw gas can be adjusted with superior accuracy. As a consequence, it is possible to realize a fuel cell system that enables performance of the stable start-up operation while holding the air-fuel ratio for the burner unit in a predetermined range.

(Third Embodiment)

Figure 11:
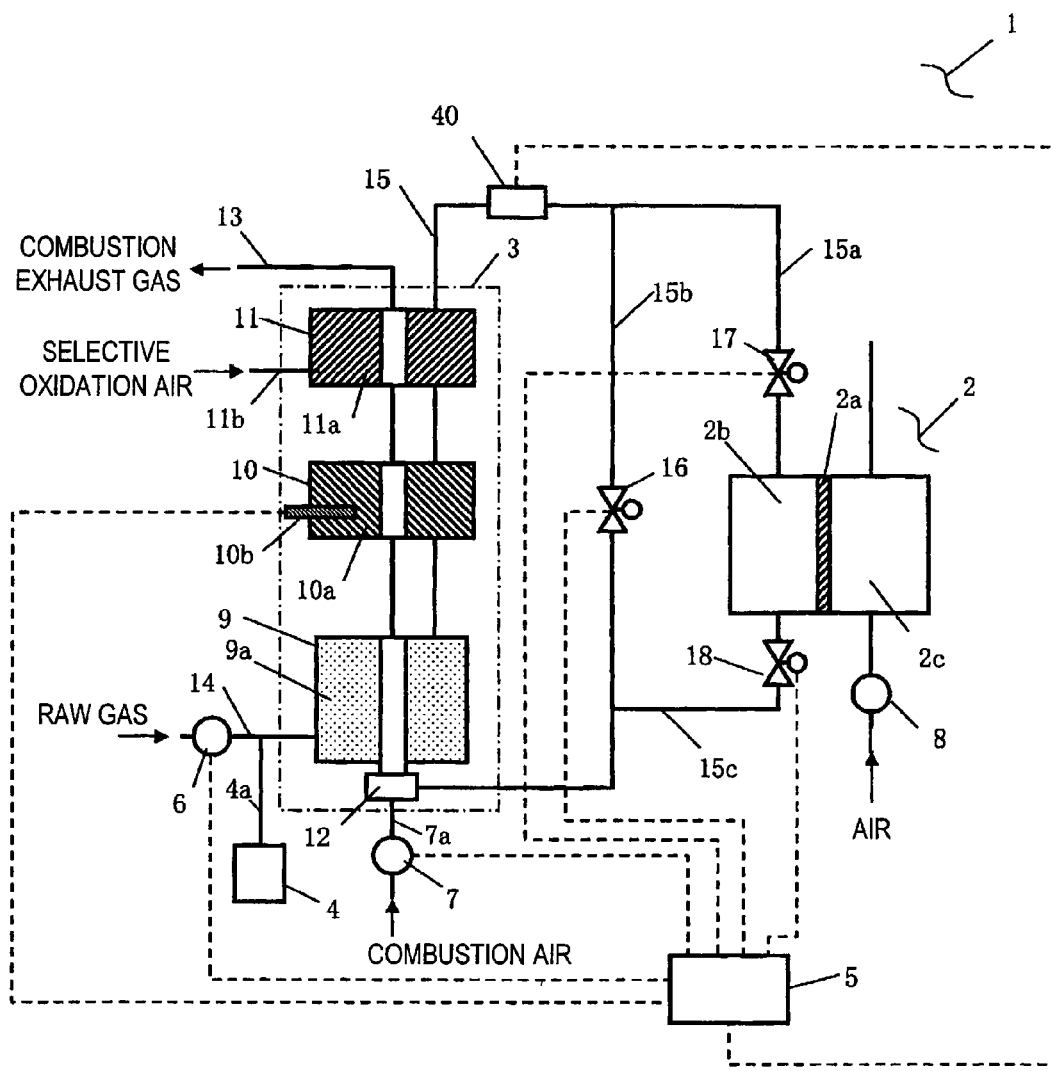
FIG. 11 is a schematic view showing a configuration of a fuel cell system of a third embodiment of the present invention.

FIG. 11 is a schematic view showing a configuration of a fuel cell system of a third embodiment of the present invention. In FIG. 11, elements that are the same as those provided in the fuel cell systems described in connection with the first and second embodiments are assigned the same reference numerals, and their explanations are omitted here for brevity.

As shown in FIG. 11, the fuel cell system 1 of the third embodiment differs from the fuel cell system 1 of the first embodiment in that the raw gas channel 15 of the fuel cell system 1 described in connection with the first embodiment is provided with a flow meter 40 that has a mutual circulatory communication with the raw gas channel 15.

At the start-up operation of the fuel cell system 1, the flow meter 40 measures a total of the flow amount of raw gas supplied from the raw gas supply device 6 and the flow amount of desorbed raw gas desorbed from the catalysts of the fuel processor 3. The combustion gas supplied to the burner unit 12 at the start-up operation of the fuel cell system 1 represents a raw gas supplied from the raw gas supply device 6 and the desorbed raw gas desorbed from the catalysts of the fuel processor 3. The flow meter 40 is wired in such a way that a flow amount of combustion gas measured by the flow meter 40 is input as a signal to the control unit 5.

Figure 12:
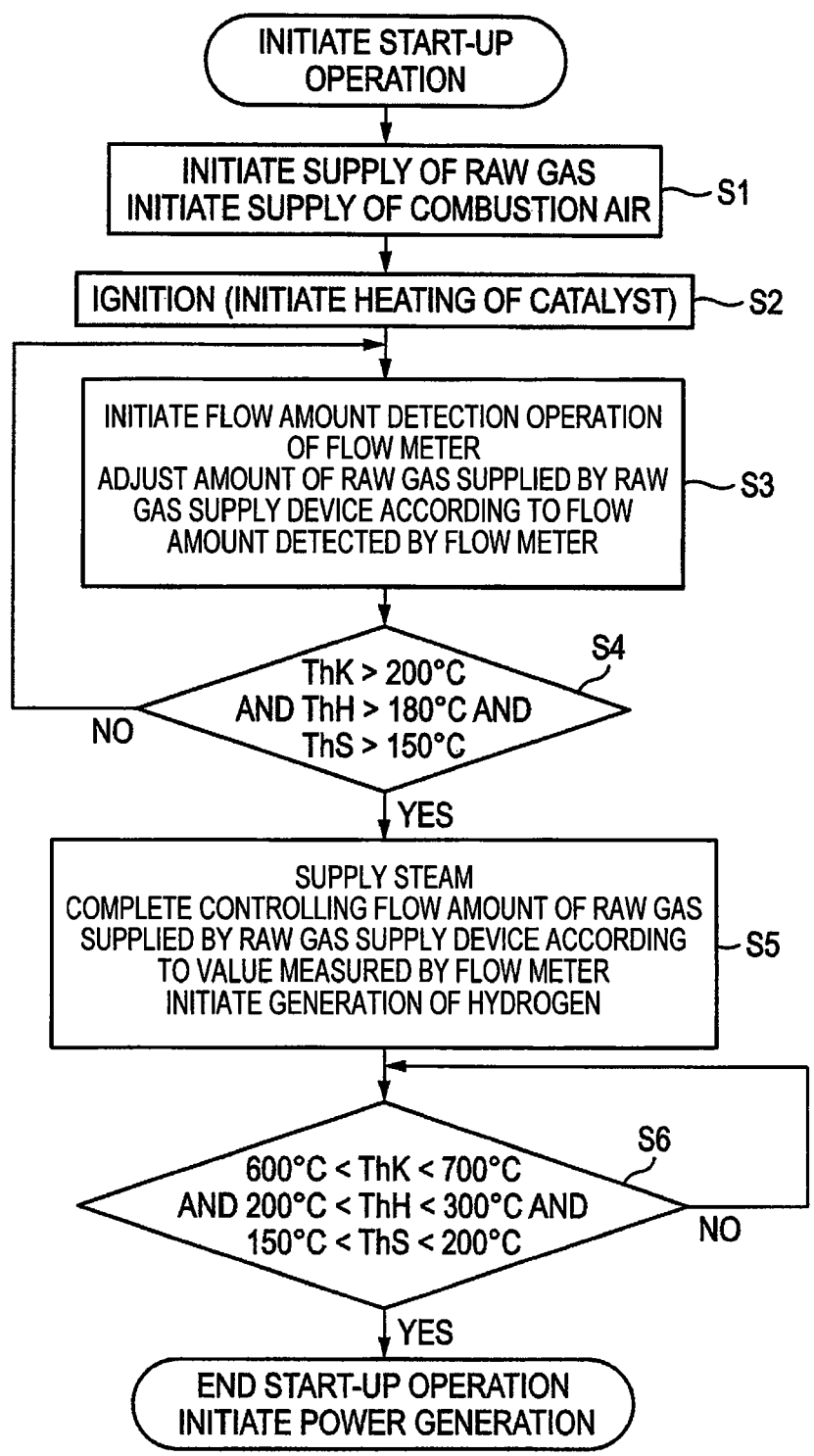
FIG. 12 is a flowchart showing control flow of a main portion at the start-up operation of the fuel cell system of the third embodiment.

The start-up operation of the fuel cell system 1 of the third embodiment is hereunder described by reference to FIG. 11 and through use of FIG. 12. FIG. 12 is a flowchart showing control flow of a principal unit performed at the start-up operation of the fuel cell system 1 of the third embodiment of the present invention. Detailed descriptions of elements that are the same as those described in connection with the other embodiments of the present invention are omitted in some case.

As shown in FIG. 12, at the start-up operation of the fuel cell system 1 the raw gas supply device 6 first supplies an LPG that is a raw gas to the burner unit 12, and the combustion air fan 7 supplies combustion air to the burner unit 12 (step S1). The LPG that is a raw gas is supplied first to the reforming unit 9 by way of the raw gas supply channel 14 and sequentially circulates through the shift unit 10 and the selective oxidation unit 11, to thus be supplied to the burner unit 12 by way of the fuel cell bypass channel 15b of the raw gas channel 15. Only the LPG that is a raw gas supplied from the raw gas supply device 6 is supplied at this point in time to the burner unit 12 as a combustion gas.

The igniter not shown ignites the thus-supplied LPG and the thus-supplied combustion air, thereby starting combustion in the burner unit 12 (step S2). When the burner unit 12 has started burning the LPG, the reforming catalyst 9a of the reforming unit 9 begins being heated by means of resultant combustion heat, whereupon the temperature (ThK) of the reforming catalyst 9a begins to increase. Concurrently, the combustion exhaust gas passes through the combustion exhaust gas channel 13 formed in the shift unit 10 and the selective oxidation unit 11, whereby the shift catalyst 10a and the selective oxidation catalyst 11a begin to be heated. The temperature (ThH) of the shift catalyst 10a and the temperature (ThS) of the selective oxidation catalyst 11a start increasing.

When the temperature of the shift catalyst 10a starts increasing, the LPG adsorbed to the shift catalyst 10a begins to be desorbed, and the desorbed LPG is supplied as a desorbed LPG to the burner unit 12. Therefore, the burner unit 12 is supplied with, as a combustion gas, the LPG that is a raw gas supplied from the raw gas supply device 6 and the desorbed LPG. The flow meter 40 starts detecting a flow amount of combustion gas at this time, and the control unit 5 begins to adjust the flow amount of raw gas supplied by the raw gas supply device 6 according to the flow amount of combustion gas detected by the flow meter 40 (step S3). The control unit 5 here controls the raw gas supply device 6 in such a way that the flow amount of combustion gas supplied to the burner unit 12 becomes constant, thereby adjusting the flow amount of raw gas supplied by the raw gas supply device 6.

The temperature (ThK) of the reforming catalyst 9a, the temperature (ThH) of the shift catalyst 10a, and the temperature (ThS) of the selective oxidation catalyst 11a are compared with their respective predetermined temperatures (step S4). When any of the temperature (ThK) of the reforming catalyst 9a, the temperature (ThH) of the shift catalyst 10a, and the temperature (ThS) of the selective oxidation catalyst 11a is lower than their corresponding predetermined temperatures (No in step S4), adjusting the amount of the raw gas supplied by the raw gas supply device 6 according to the flow amount of combustion gas detected by the flow meter 40 is continually performed. In the fuel cell system 1 of the third embodiment, the predetermined temperature for the temperature (ThK) of the reforming catalyst 9a is set to 200° C.; the predetermined temperature for the temperature (ThH) of the shift catalyst 10a is set to 180° C.; and the predetermined temperature for the temperature (ThS) of the selective oxidation catalyst 11a is set to 150° C., as in the fuel cell systems 1 of the other embodiments.

When all of the temperature (ThK) of the reforming catalyst 9a, the temperature (ThH) of the shift catalyst 10a, and the temperature (ThS) of the selective oxidation catalyst 11a come to their predetermined temperatures or more (Yes in step S4), the steam generating device 4 starts supplying steam to the raw gas supply channel 14 by way of the steam channel 4a. Further, flow control of the amount of raw gas supplied by the raw gas supply device 6 based on the value measured by the flow meter 40 is completed. A mixed gas containing the LPG and steam is supplied to the layer filled with the reforming catalyst 9a of the reforming unit 9, whereupon reforming the LPG to hydrogen is started (step S5).

Flow control of the amount of raw gas supplied by the raw gas supply device 6 based on the value measured by the flow meter 40 is completed simultaneous with initiation of a steam supply. The reason for this is that a composition of the combustion gas circulating through the flow meter 40 changes from the LPG, which is the past composition, to the reformed gas including hydrogen and that the reformed gas contains steam. For these reasons, the flow meter 40 becomes impossible to accurately measure the flow amount of combustion gas.

However, when all of the temperature (ThK) of the reforming catalyst 9a, the temperature (ThH) of the shift catalyst 10a, and the temperature (ThS) of the selective oxidation catalyst 11a come to their predetermined temperatures or more, the desorbed raw gas desorbed from the catalysts (i.e., the desorbed LPG in the third embodiment) substantially become extinct as shown in FIG. 3. Therefore, the desorbed raw gas hardly affects the combustion in the burner unit 12 and; hence, the ratio of the combustion air supplied by the combustion air fan 7 to the raw gas comes to a predetermined ratio, whereby combustion in the burner unit 12 becomes stable.

A determination is now made as to whether or not the respective catalysts are at respective predetermined temperatures; namely, whether or not the reforming catalyst stays in a temperature range from about 600 to 700° C.; whether or not the shift catalyst stays in a temperature range from about 200 to 300° C.; and whether or not the selective oxidation catalyst stays in a temperature range from about 150 to 200° C. (step S6). When the temperatures of the respective catalysts are lower than their respective temperature ranges (No in step S6), reactions occurred in the respective catalysts are insufficient. Namely, the amount of hydrogen in the reformed gas is small, and the amount of carbon monoxide in the gas is large. Therefore, the reformed gas in the course of heat-up operation is caused to circulate through the fuel cell bypass channel 15b. When the temperatures of the respective catalysts have increased to their predetermined temperature ranges (Yes in step S6), the fuel cell bypass valve 16 is closed after the components of the reformed gas have become stable. Concurrently, the reformed gas is supplied to the anode electrode 2b of the fuel cell 2 by opening the fuel cell entrance valve 17 and the fuel cell exit valve 18, whereupon power generation is started. When the temperatures of the respective catalysts are out of their temperature ranges (No in step S6), control analogous to that performed in the related art is performed, and processing waits until the temperatures of the catalysts fall within their temperature ranges.

As described above, in the fuel cell system 1 of the present embodiment the flow meter can measure, at the start-up operation, the flow amount of desorbed raw gas desorbed with a temperature rise of the shift catalyst in conjunction with the flow amount of raw gas supplied from the raw gas supply device 6 and can adjust the flow amount of desorbed raw gas by adjusting the amount of raw gas supplied by the raw gas supply device 6 according to a measured value of the flow meter. Accordingly, combustion of the burner unit 12 can be made stable. Consequently, stable combustion is realized by preventing occurrence of incomplete combustion, and the start-up operation of the fuel cell system 1 can be performed without fail.

In the fuel cell system 1 of the third embodiment, the flow meter 40 is disposed in the raw gas channel. However, the flow meter can also be disposed in a fuel cell bypass channel or an off-gas channel.

In the fuel cell system 1 of the third embodiment, the raw gas is supplied from the raw gas supply device 6 to the burner unit 12 by way of the fuel processor 3 at the start-up operation of the fuel cell system 1. However, the fuel cell system 1 can also be configured as follows. Namely, the fuel cell system 1 is provided with a branch channel that additionally branches off from the raw gas supply device 6 to supply the raw gas directly to the burner unit 12 and channel switching means that causes switching whether to supply the raw gas from the raw gas supply device 6 to the fuel processor 3 or to supply the raw gas directly to the burner unit 12 by way of the branch channel. The raw gas supplied from the raw gas supply device is supplied directly to the burner unit by way of the branch channel at an initial start-up phase of the fuel cell system and until the temperatures of the respective catalysts of the fuel processor 3 are sufficiently decreased to predetermined temperatures at which a concentration of carbon dioxide is sufficiently decreased and that are appropriate for producing a excellent reformed gas sufficiently containing hydrogen. In this case, the flow meter 40 measures the flow amount of desorbed raw gas desorbed from the respective catalysts of the fuel processor 3. The control unit 5 controls the amount of raw gas supplied from the raw gas supply device 6 in such a way that the flow amount of combustion gas supplied to the burner unit 12 becomes corresponding to the flow amount of combustion air supplied by the combustion air fan 7 according to the flow amount of desorbed raw gas measured by the flow meter 40. An advantage similar to that yielded by the third embodiment can be yielded.

In the fuel cell system 1 of the third embodiment, by use of the flow meter 40 the total of the flow amount of raw gas supplied from the raw gas supply device 6 and the flow amount of desorbed raw gas desorbed from the respective catalysts of the fuel processor 3. However, measurement can also be performed by use of a pressure gauge. Specifically, an advantage analogous to that yielded by the third embodiment can also be acquired, for example, by connecting a pressure gauge to the raw gas channel; previously storing in the control unit 5 a relationship between the flow amount of gas in the raw gas channel and pressure; at the start-up operation of the fuel cell system 1 estimating the flow amount of raw gas supplied to the burner unit 12 (i.e., a total of the amount of raw gas supplied from the raw gas supply device 6 and the flow amount of desorbed raw gas desorbed from the respective catalysts of the fuel processor 3) from the value measured by the pressure gauge; and the control unit 5 controlling the flow amount of raw gas supplied from the raw gas supply device 6 according to an estimated value.

The third embodiment has been described by use of the LPG as a raw gas. However, the raw gas is not limited to the LPG as in the other embodiments. Another hydrocarbon-based raw, like a city gas or kerosene, can also be used. When a liquid hydrocarbon-based material, like kerosene, is used, it is preferable to gasify the material. Further, when the type of the raw gas has changed, a change is assumed to occur in the amount of the raw gas adsorbed to the respective catalysts of the fuel processor 3 or in temperatures of the respective catalysts and a behavior of the flow amount of desorbed raw gas. However, in the fuel cell system 1 of the third embodiment, the amount of raw gas that contains the desorbed raw gas and that is supplied to the burner unit 12 is measured, and the flow amount of raw gas supplied from the raw gas supply device 6 is controlled according to the thus-measured value. Hence, combustion of the burner unit 12 can be made stable. However, according to the type of a raw gas, it is necessary to use a flow meter capable of measuring a flow amount of the raw gas as the flow meter 40.

In the fuel cell system 1 of the third embodiment, timing for completing controlling the amount of raw gas from the raw gas supply device 6 according to the amount of raw gas detected by the flow meter 40 is set to timing when the temperatures of the respective catalysts of the fuel processor reach predetermined temperatures or more, thereupon supplying steam. However, timing is not limited to that mentioned above, so long as the temperatures of the respective catalysts increase in excess of temperatures at which the desorbed raw gas stops affecting combustion of the burner unit 12.

(Fourth Embodiment)

Figure 13:
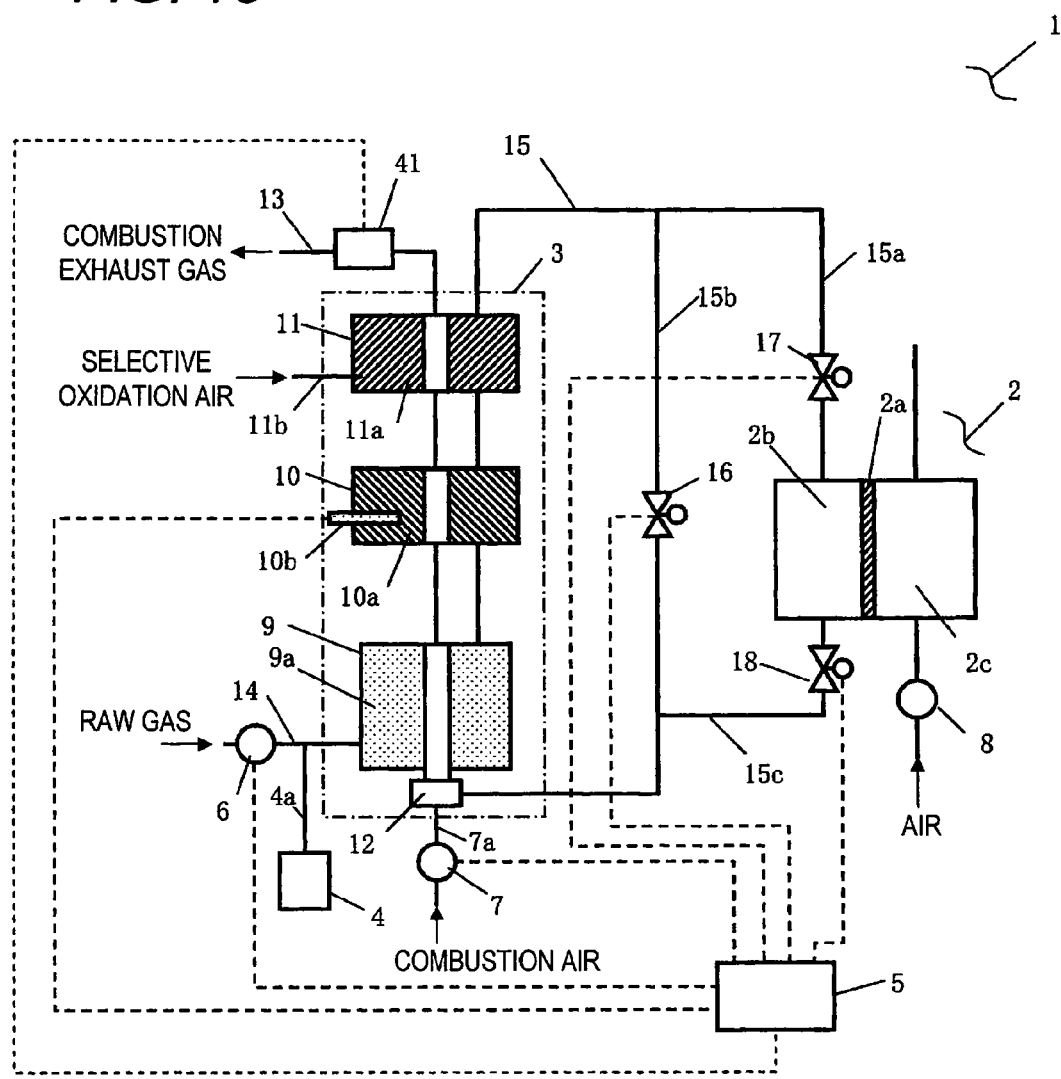
FIG. 13 is a schematic diagram showing a configuration of the fuel cell system of a fourth embodiment of the present invention.

FIG. 13 is a schematic diagram showing a configuration of the fuel cell system 1 of a fourth embodiment of the present invention. In FIG. 13, those constituent elements that are the same as those of the fuel systems 1 described in the previously-described first through third embodiments are assigned the same reference numerals, and their explanations are omitted.

As shown in FIG. 13, the fuel cell system 1 of the fourth embodiment is different from the fuel cell system 1 of the first embodiment in that the combustion exhaust gas channel 13 of the fuel cell system 1 described in connection with the first embodiment is provided with an oxygen meter 41 that is equivalent to exhaust gas analysis means and that measures a concentration of oxygen in a combustion exhaust gas.

The oxygen meter 41 measures a concentration of oxygen in a combustion exhaust gas produced as a result of the burner 12 having burnt the raw gas or an off-gas, a reformed gas, or the like, along with the combustion air. The oxygen meter 41 is electrically connected in such a way that the measured value is input as a signal to the control unit 5.

Figure 14:
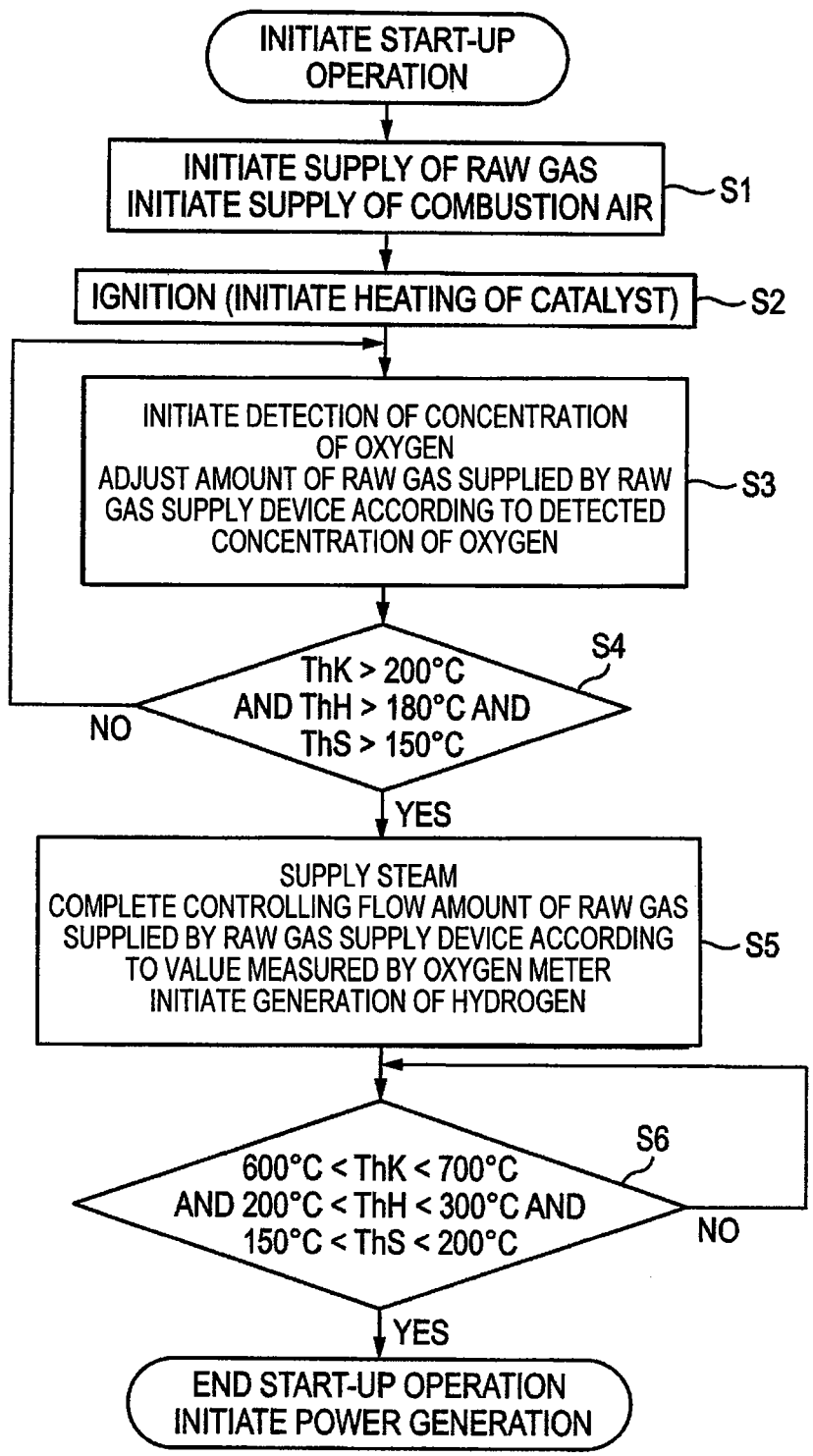
FIG. 14 is a flowchart showing control flow of the main portion at the start-up operation of the fuel cell system of the fourth embodiment.

Operation performed at the start-up operation of the fuel cell system 1 of the fourth embodiment is hereunder described by reference to FIG. 13 and through use of FIG. 14. FIG. 14 is a flowchart showing control flow of the principal unit achieved at the start-up operation of the fuel cell system 1 of the fourth embodiment. Detailed descriptions of elements that are the same as those described in connection with the other embodiments of the present invention are often omitted.

As shown in FIG. 14, at the start-up operation of the fuel cell system 1 the raw gas supply device 6 first supplies a predetermined flow amount of an LPG that is a raw gas to the burner unit 12, and the combustion air fan 7 supplies a predetermined flow amount of combustion air to the same (step S1). The LPG that is a raw gas is first supplied to the reforming unit 9 by way of the raw gas supply channel 14; is sequentially circulated through the shift unit 10 and the selective oxidation unit 11; and is supplied to the burner unit 12 by way of the fuel cell bypass channel 15b of the raw gas channel 15. Only the LPG that is a raw gas supplied from the raw gas supply device 6 is supplied as a combustion gas to the burner unit 12 at this point in time.

In the burner unit 12, the thus-supplied LPG and combustion air are ignited by an igniter not shown, whereupon combustion begins (step S2). When the burner unit 12 starts burning the LPG, the temperature (ThK) of the reforming catalyst 9a begins increasing. Concurrently, a combustion exhaust gas sequentially passes through the combustion exhaust gas channel 13 in the shift unit 10 and the selective oxidation unit 11, whereby the shift catalyst 10a and the selective oxidation catalyst 11a begin to be heated. The temperature (ThH) of the shift catalyst 10a and a temperature (ThS) of the selective oxidation catalyst 11a thereby start increasing.

Next, the oxygen meter 41 starts measuring the concentration of oxygen in the combustion exhaust gas output from the burner unit 12 and sending an input to the control unit 5. According to the concentration of oxygen measured by the oxygen meter 41, the control unit 5 controls the flow amount of raw gas supplied by the raw gas supply device 6 in such a way that the concentration of oxygen measured by the oxygen meter 41 comes to a predetermined concentration of oxygen (step S3). Specifically, when the concentration of oxygen in the combustion exhaust gas to be measured by the oxygen meter 41 is lower than a predetermined concentration of oxygen, the flow amount of raw gas supplied by the raw gas supply device 6 is decreased. In contrast, when the concentration of oxygen in the combustion exhaust gas is higher than the predetermined concentration of oxygen, the flow amount of raw gas supplied by the raw gas supply device 6 is increased.

When the temperatures of the respective catalysts in the fuel processor 3 start increasing and when the raw gas adsorbed to the catalysts thereupon begin to be desorbed, a total of the amount of raw gas supplied from the raw gas supply device 6 and the amount of desorbed raw gas desorbed from the catalyst is supplied to the burner unit 12. However, the flow amount of raw gas supplied by the raw gas supply device 6 is adjusted according to the concentration of oxygen in the combustion exhaust gas, and hence a combustion gas (i.e., a mixed gas containing the raw gas supplied by the raw gas supply device 6 and the desorbed raw gas) is supplied to the burner unit 12.

The temperature (ThK) of the reforming catalyst 9a, the temperature (ThH) of the shift catalyst 10a, and the temperature (ThS) of the selective oxidation catalyst 11a are compared with their predetermined temperatures (step S4). When the temperature (ThK) of the reforming catalyst 9a, the temperature (ThH) of the shift catalyst 10a, and the temperature (ThS) of the selective oxidation catalyst 11a are lower than their predetermined temperatures (No in step S4), adjusting the flow amount of raw gas supplied from the raw gas supply device 6 according to the concentration of oxygen in the combustion exhaust gas detected by the oxygen meter 41 is continually performed. In the fuel cell system 1 of the fourth embodiment, the predetermined temperature for the temperature (ThK) of the reforming catalyst 9a is set to 200° C.; the predetermined temperature for the temperature (ThH) of the shift catalyst 10a is set to 180° C.; and the predetermined temperature for the temperature (ThS) of the selective oxidation catalyst 11a is set to 150° C., as in the fuel cell systems 1 of the other embodiments.

When all of the temperature (ThK) of the reforming catalyst 9a, the temperature (ThH) of the shift catalyst 10a, and the temperature (ThS) of the selective oxidation catalyst 11a come to their predetermined temperatures or more (Yes in step S4), the steam generating device 4 starts supplying steam to the raw gas supply channel 14 by way of the steam channel 4a. Further, flow control of the amount of raw gas supplied by the raw gas supply device 6 based on the value measured by the oxygen meter 41 is completed. A mixed gas containing the LPG and steam is supplied to the layer filled with the reforming catalyst 9a of the reforming unit 9, whereupon reforming the LPG to hydrogen is started (step S5).

When the temperature (ThH) of the shift catalyst 10a has come to the predetermined temperature (180° C. in the embodiment) or more, the desorbed raw gas desorbed from the catalyst (i.e., the desorbed LPG in the embodiment) substantially becomes extinct, thereby posing very little influence on the combustion in the burner 12. For these reasons, the flow amount of raw gas in accordance with the amount of combustion air supplied from the combustion air fan 7 is supplied.

A determination is now made as to whether or not the respective catalysts are at respective predetermined temperatures; namely, whether or not the reforming catalyst stays in a temperature range from about 600 to 700° C.; whether or not the shift catalyst stays in a temperature range from about 200 to 300° C.; and whether or not the selective oxidation catalyst stays in a temperature range from about 150 to 200° C. (step S6). When the temperatures of the respective catalysts are lower than their respective temperature ranges (No in step S6), reactions occurred in the respective catalysts are insufficient. Namely, the amount of hydrogen in the reformed gas is small, and the amount of carbon monoxide in the gas is large. Therefore, the reformed gas in the course of heat-up operation is caused to circulate through the fuel cell bypass channel 15b. When the temperatures of the respective catalysts have increased to their predetermined temperature ranges (Yes in step S6), the fuel cell bypass valve 16 is closed after the components of the reformed gas have become stable. Concurrently, the reformed gas is supplied to the anode electrode 2b of the fuel cell 2 by opening the fuel cell entrance valve 17 and the fuel cell exit valve 18, whereupon power generation is started. When the temperatures of the respective catalysts are out of their temperature ranges (No in step S6), control analogous to that performed in the related art is performed, and processing waits until the temperatures of the catalysts fall within their temperature ranges.

As described above, in the fuel cell system 1 of the fourth embodiment, at the start-up operation, the flow amount of desorbed raw gas by adjusting the amount of raw gas supplied by the raw gas supply device 6 is adjusted according to a concentration of oxygen in the combustion exhaust gas. Accordingly, even when the raw gas adsorbed to the catalysts are desorbed with the temperature rise of the catalysts of the fuel processor, to thus be supplied to the burner unit 12, combustion in the burner unit 12 can be made stable. As a consequence, stable combustion is realized by preventing occurrence of incomplete combustion, and the start-up operation of the fuel cell system 1 can be performed without fail.

The fuel cell system 1 of the fourth embodiment adjusts the flow amount of raw gas supplied from the raw gas supply device in such a way that the concentration of oxygen in the combustion exhaust gas comes to a predetermined concentration by use of the oxygen meter that measures the concentration of oxygen in the combustion exhaust gas. A carbon dioxide concentration meter that measures the concentration of carbon dioxide in the combustion exhaust gas can also be used. In this case, when the temperature of the catalysts in the fuel processor starts increasing whereby the flow amount of raw gas burnt by the burner unit is increased by the desorbed raw gas, the concentration of carbon dioxide in the combustion exhaust gas increases. Therefore, so long as the flow amount of raw gas supplied from the raw gas supply device is decreased correspondingly, an advantage similar to that provided by the fuel cell system 1 of the fourth embodiment can be yielded.

The present patent application is based on Japanese Patent Application (Application No. 2009-115413) filed on May 12, 2009, the entire subject matter of which is incorporated herein by reference.

INDUSTRIAL APPLICABILITY

The fuel cell system of the present invention capable of performing a stable start-up operation with stable combustion in a burner unit. Therefore, the fuel cell system is useful in a technical field of a fuel cell system that utilizes a hydrocarbon-based raw, such as a town gas or an LPG, subjected to steam reforming.

The invention claimed is:

1. A fuel cell system comprising:
    a reforming unit configured to subject a mixed gas containing a raw gas and steam to a reforming reaction by a reforming catalyst, thereby generating a reformed gas containing hydrogen;
    a carbon monoxide decreasing unit configured to allow the reformed gas generated by the reforming unit to contact a carbon monoxide decreasing catalyst, thereby decreasing carbon monoxide contained in the reformed gas;
    a fuel cell configured to generate electric power by hydrogen contained in the reformed gas passed through the carbon monoxide decreasing unit;
    a burner unit configured to burn at least one of an off-gas containing hydrogen not consumed in the fuel cell, the raw gas and the reformed gas using combustion air supplied by an air blower;
    a raw gas supply device configured to supply the raw gas to the reforming unit and the burner unit directly or through the reforming unit;
    one or more temperature sensors configured to detect at least one of a temperature of the reforming catalyst and a temperature of the carbon monoxide decreasing catalyst; and
    a control unit,
        wherein the control unit is configured to store therein a correlation between the temperature of the reforming catalyst detected by the one or more temperature sensors and an amount of the desorbed raw gas desorbed from the reforming catalyst or a correlation between the temperature of the carbon monoxide decreasing catalyst detected by the one or more temperature sensors and an amount of desorbed raw gas desorbed from the carbon monoxide decreasing catalyst, and,
        wherein at a start-up operation of the fuel cell system, the control unit programmed to determine, based on at least one of the temperature of the reforming catalyst and the temperature of the carbon monoxide decreasing catalyst detected by the one or more temperature sensors, the amount of the desorbed raw gas desorbed out of the components of the raw gas adsorbed to at least one of the reforming catalyst and the carbon monoxide decreasing catalyst, and adjusts an amount of raw gas supplied from the raw gas supply device according to the amount of the obtained desorbed raw.

2. The fuel cell system according to claim 1, further comprising a heating unit configured to perform a heating operation for at least one of the reforming catalyst and the carbon monoxide decreasing catalyst,
    wherein the heating unit heats at least one of the reforming catalyst and the carbon monoxide catalyst.

3. The fuel cell system according to claim 1, wherein the measurement unit comprises a pressure gauge configured to detect at least pressure of the desorbed raw gas.

4. The fuel cell system according to claim 2, further comprising a timer unit configured to measure a time elapsed since the heating unit starts the heating operation,
    wherein the amount of the desorbed raw gas, which is desorbed out of the components of the raw gas adsorbed to at least one of the reforming catalyst and the carbon monoxide decreasing catalyst and which is to be burnt in the burner unit, is estimated based on the time measured by the timer unit.

5. The fuel cell system according to claim 2, wherein the heating unit starts the heating operation for at least one of the reforming catalyst and the carbon monoxide decreasing catalyst at the start-up operation of the fuel cell system, and
    wherein the raw gas supply device is activated after elapse of a predetermined time since the heating unit starts the heating operation.

6. The fuel cell system according to claim 2, further comprising one or more temperature sensors configured to detect at least one of a temperature of the reforming catalyst and a temperature of the carbon monoxide decreasing catalyst,
    wherein the heating unit starts the heating operation for at least one of the reforming catalyst and the carbon monoxide decreasing catalyst at the start-up operation of the fuel cell system, and
    wherein the raw gas supply device is activated after the temperature detected by the temperature sensor becomes a predetermined temperature or more.

7. The fuel cell system according to claim 2,
    wherein at the start-up operation of the fuel cell system, the raw gas supply device and the heating unit are activated,
    wherein after the raw gas supply device supplies the raw gas for a predetermined time period, the raw gas supply device is deactivated, and
    wherein after elapse of a predetermined time period since the raw gas supply device is deactivated, the raw gas supply device is activated.

8. The fuel cell system according to claim 2, further comprising one or more temperature sensors configured to detect at least one of a temperature of the reforming catalyst and a temperature of the carbon monoxide catalyst,
    wherein at the start-up operation of the fuel cell system, the raw gas supply device and the heating unit are activated, wherein after elapse of a predetermined time period since the raw gas supply device starts to supply the raw gas or after the temperature sensor detects a first predetermined temperature or more, the raw gas supply device is deactivated, and wherein after the temperature sensor detects a second predetermined temperature or more, the raw gas supply device is activated.

9. The fuel cell system according to claim 2, wherein the heating unit comprises an electric heater configured to heat at least one of the reforming catalyst and the carbon monoxide catalyst.

10. The fuel cell system according to claim 2, wherein the heating unit comprises a heating burner unit configured to heat at least one of the reforming catalyst and the carbon monoxide catalyst, and wherein at least one of the reforming unit and the carbon monoxide decreasing unit is heated by a combustion exhaust gas of the heating burner unit.

11. The fuel cell system according to claim 10, wherein the burner unit is used as the heating burner unit.

\* \* \* \* \*